US012036467B2

(12) United States Patent
Kong et al.

(10) Patent No.: US 12,036,467 B2
(45) Date of Patent: Jul. 16, 2024

(54) HANDHELD DEVICE, DOCK AND CORRESPONDING METHODS AND SYSTEMS

(71) Applicant: Intel Corporation, Santa Clara, CA (US)

(72) Inventors: Duck Young Kong, Beaverton, OR (US); Denica Larsen, Portland, OR (US); Shantanu Kulkarni, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 280 days.

(21) Appl. No.: 17/314,167

(22) Filed: May 7, 2021

(65) Prior Publication Data

US 2021/0308566 A1 Oct. 7, 2021

Related U.S. Application Data

(60) Provisional application No. 62/704,393, filed on May 8, 2020.

(51) Int. Cl.
*A63F 13/24* (2014.01)
*A63F 13/92* (2014.01)

(52) U.S. Cl.
CPC .............. *A63F 13/24* (2014.09); *A63F 13/92* (2014.09)

(58) Field of Classification Search
CPC ........... A63F 13/24; A63F 13/92; A63F 13/22
See application file for complete search history.

(56) References Cited

U.S. PATENT DOCUMENTS

2015/0169009 A1  6/2015 Ghosh et al.
2019/0358534 A1* 11/2019 Fang ...................... A63F 13/24

OTHER PUBLICATIONS

Nintendo Switch Technical Specs published to (https://www.nintendo.com/switch/tech-specs/) regarding the Nintendo Switch released Mar. 2017 (Year: 2017).*
Nintendo 3DS Wikipedia page published to (https://en.wikipedia.org/wiki/Nintendo_3DS) regarding the Nintendo 3DS released Feb. 2011 (Year: 2011).*

* cited by examiner

*Primary Examiner* — Peter J Iannuzzi
(74) *Attorney, Agent, or Firm* — 2SPL Patent Attorneys PartG mbB; Kieran O'Leary

(57) ABSTRACT

Examples relate to a handheld device, a dock for a handheld device, and to corresponding methods and systems. The handheld device comprises a main unit comprising a display of the handheld device. The handheld device comprises two input controllers being non-removably attached to the main unit via an extension mechanism. The extension mechanism is configured such, that the two input controllers are movable from a retracted configuration to an extended configuration.

24 Claims, 22 Drawing Sheets

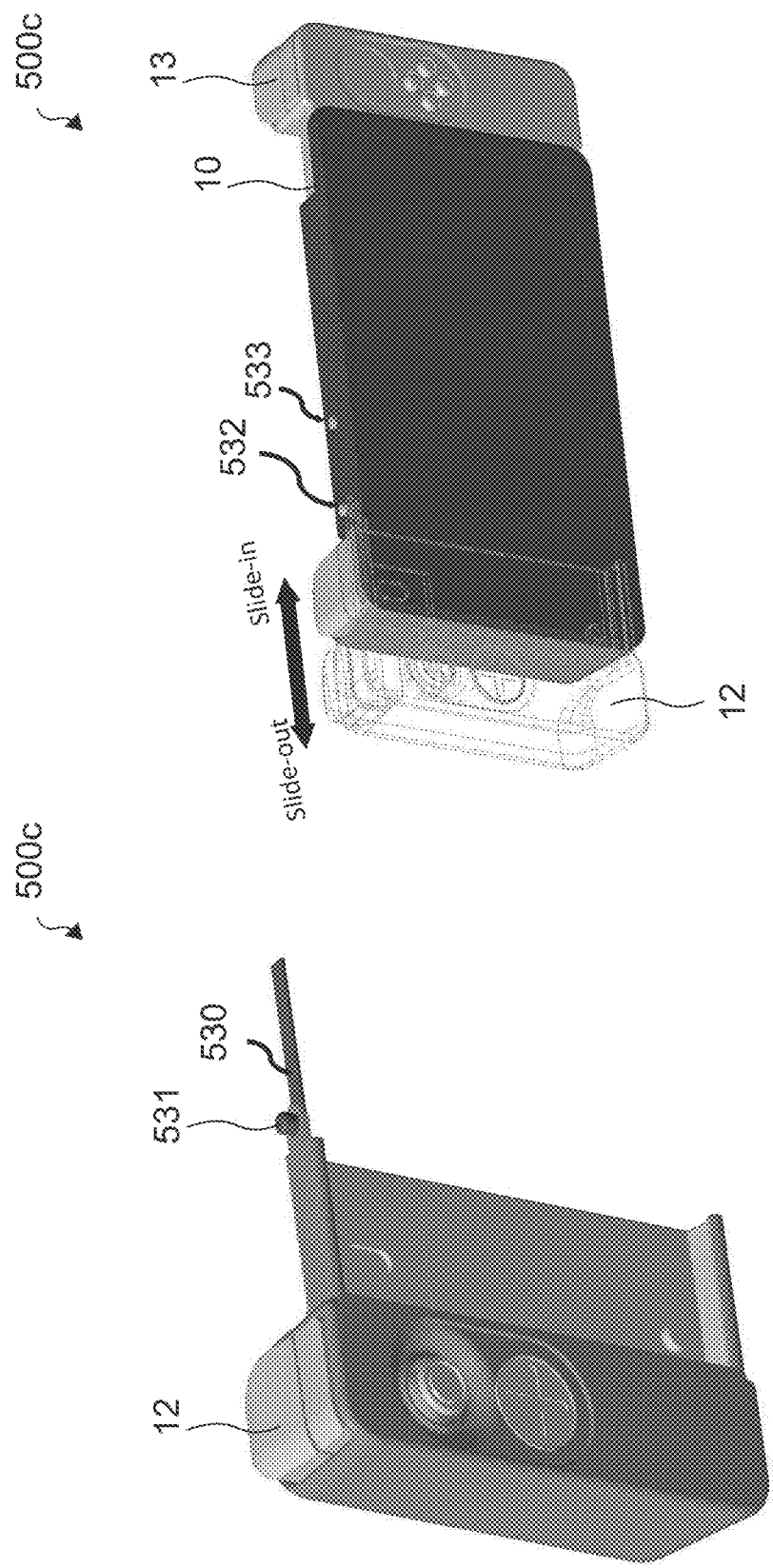

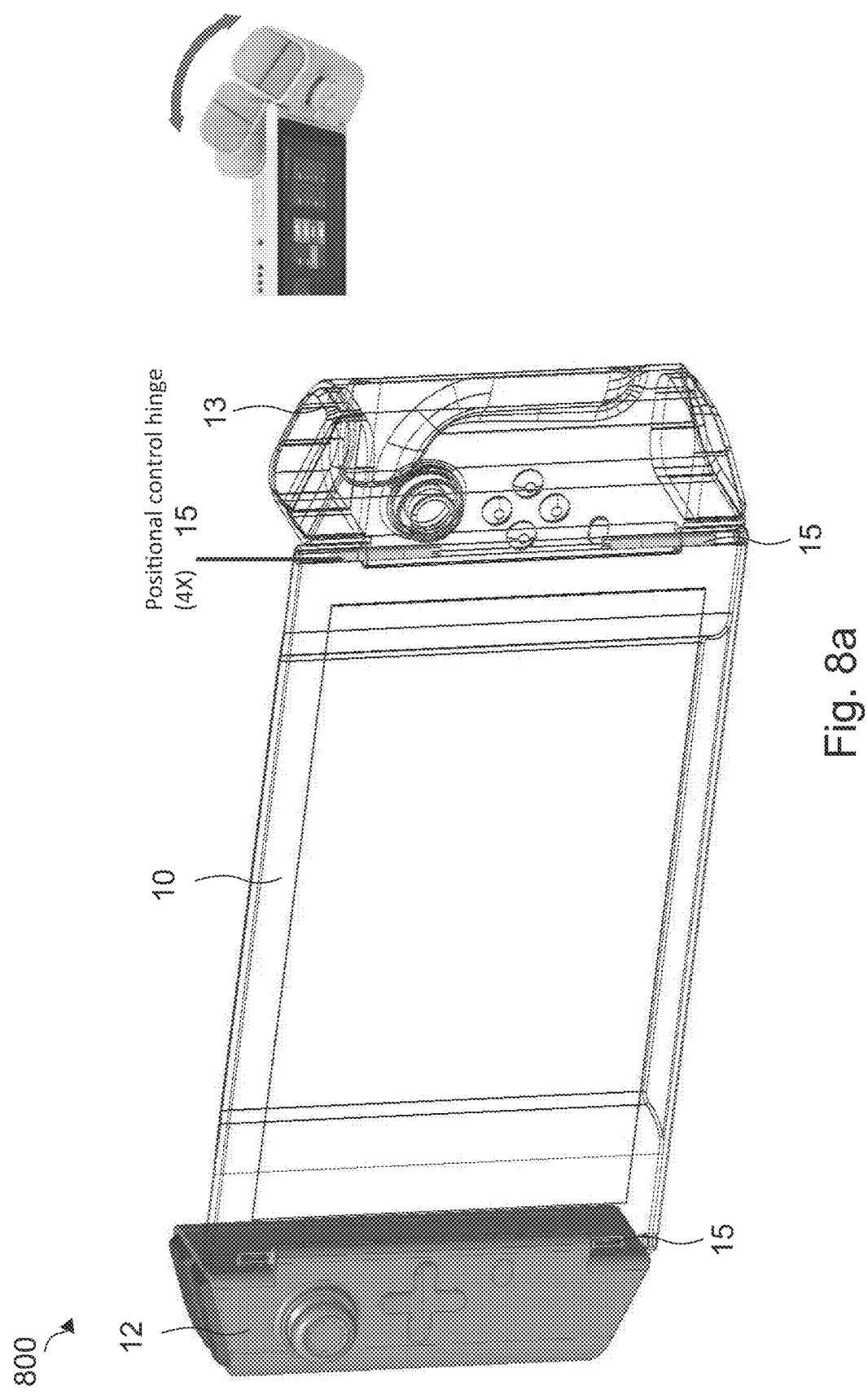

HANDHELD DEVICE, DOCK AND CORRESPONDING METHODS AND SYSTEMS

FIELD

Examples relate to a handheld device, a dock for a handheld device, and to corresponding methods and systems.

BACKGROUND

Handheld devices, such as handheld gaming devices, are popular platforms, for example for gaming, personal computing and entertainment.

BRIEF DESCRIPTION OF THE FIGURES

Some examples of apparatuses and/or methods will be described in the following by way of example only, and with reference to the accompanying figures, in which

FIGS. 5a to 5d show schematic illustrations of various implementations of a handheld device with a sliding mechanism;

FIG. 8a shows a schematic illustration of an example of a handheld device with a folding mechanism;

DETAILED DESCRIPTION

Figure 1A:
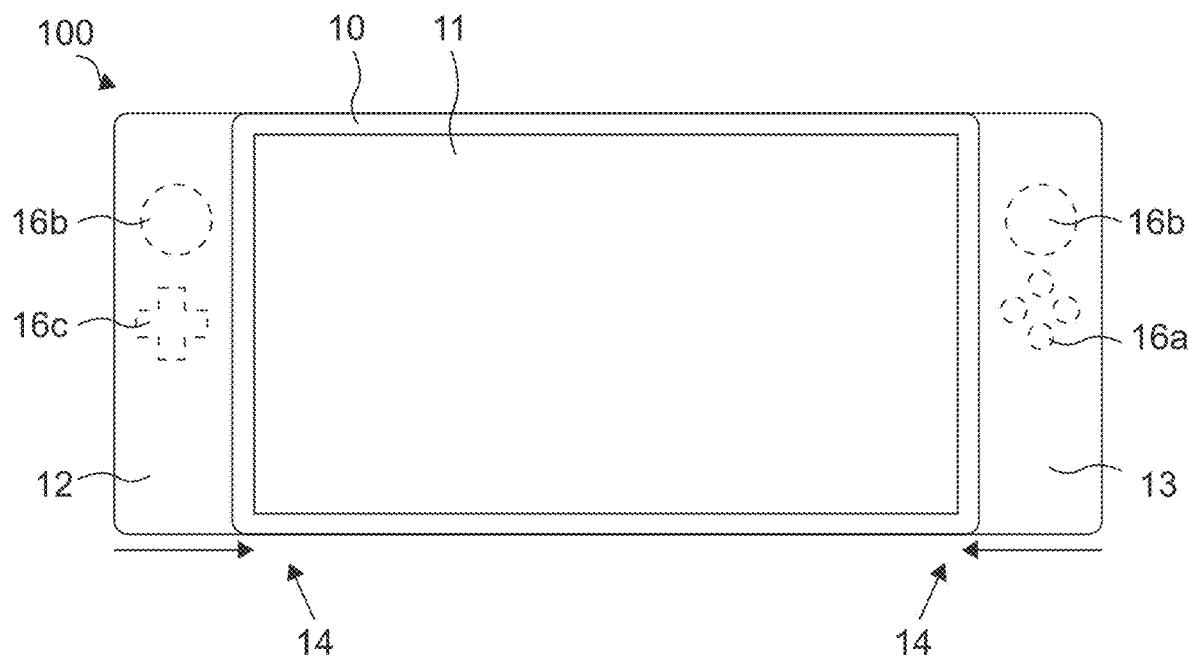
FIGS. 1a and 1b show illustrations of an example of a handheld device with an extension mechanism, the extension mechanism being a sliding mechanism.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Various examples relate to a sliding controller form factor or a folding controller form factor and corresponding usages for a handheld gaming personal computer (PC).

Various examples relate to innovative handheld PC gaming systems. User Experience testing (with gamers) was conducted to develop a concept that overcomes shortcomings exhibited by other systems. From testing, an 8-inch display was found to be the sweet spot for mobility and immersive gaming. However, controllers on 8" display increase the overall size of the device, making it bulky. Furthermore, launching gaming apps may not be seen as intuitive on a desktop operating system (OS), such as Microsoft Windows. Furthermore, handheld gaming PCs are often heavy, with the weight being distributed in the center of the device which makes the device feels heavier—in examples of the present disclosure, however, the weight may be spread out to the controller. Furthermore, other handheld PC gaming systems might not have ergonomic grips for controllers. Also, controller buttons are often exposed while carrying making it prone to damage.

Examples provide an innovative full-featured (FF) design that increases system mobility, usability, and addresses other considerations like better ergonomics, weight perception, clean ID, better thermals, exposed buttons etc.

Other concepts for handheld gaming PCs may either provide a design with a 7-inch display, which may be less desirable, or have an 8-inch display that leads to a bulky design. Furthermore, if used with a desktop OS, other concepts might not provide an improved usage of the operating system. Furthermore, controllers of handheld gaming devices often are not very ergonomic to hold. Examples of the present disclosure provide a design and architecture for a novel handheld gaming concept, which may address the challenges mentioned above and provide new user experiences.

Examples of the present disclosure provide a handheld device. The components of the handheld device are, in the following, described in relation to their structural components. The respective structural components may implement more abstract corresponding functional components, which, in the following, are introduced together with the corresponding structural components. The handheld device comprises a main unit 10 with a display 11 (i.e. display means) of the handheld device. The handheld device further comprises two input controllers 12; 13 (i.e. two input controlling means) that are non-removably attached to the main unit via an extension mechanism 14; 15 (i.e. extension means). The extension mechanism is configured such, that the two input controllers are movable from a retracted configuration to an extended configuration (i.e. in between the retracted and extended configurations). In some examples, as shown in FIGS. 1a to 5d, the extension mechanism is a sliding mechanism 14 (i.e. sliding means). In some other examples, as shown in FIGS. 6a to 8b, the extension mechanism is a folding mechanism 15 (i.e. folding means). While various aspects are, in the following, described in relation to the sliding mechanism, at least some aspects, such as the cooling system, batteries, usage etc., may also be applied to the handheld device with the folding mechanism. For example, the handheld device may be a handheld gaming device, e.g. a handheld gaming PC with a desktop operating system.

Figure 1B:
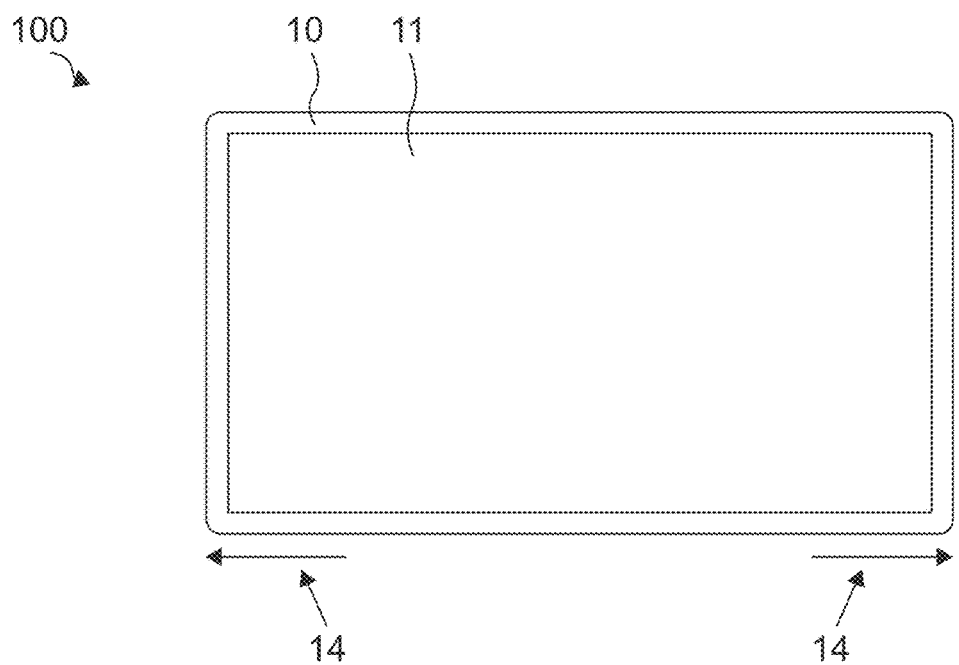

FIGS. 1a and 1b show illustrations of an example of a handheld device 100 with an extension mechanism, the extension mechanism being a sliding mechanism 14. The handheld device comprises a main unit 10 with a display 11 of the handheld device. The handheld device 100 comprises two input controllers 12; 13 that are non-removably attached to the main unit via the sliding mechanism 14. The sliding mechanism 14 is configured such, that the two input controllers are movable from a retracted configuration to an extended configuration.

Figure 1C:
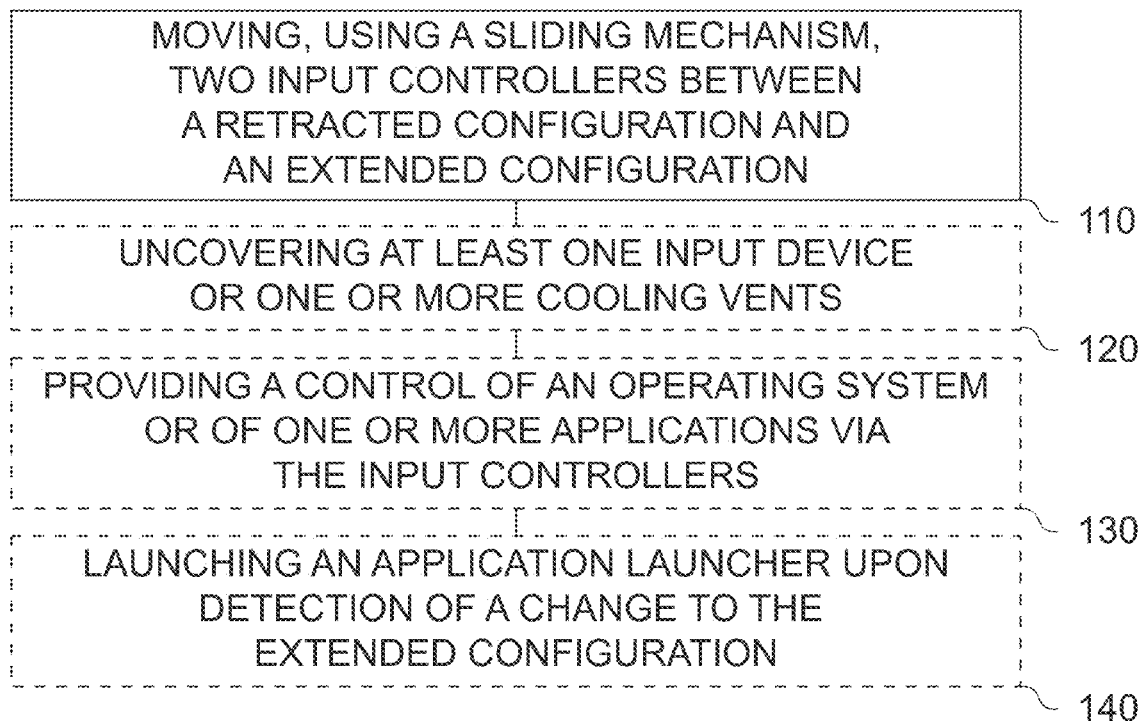
FIG. 1c shows a flow chart of an example of a method for a handheld device with a sliding mechanism.

Examples of the present disclosure further provide a corresponding method for the handheld device. FIG. 1c shows a flow chart of an example of a corresponding method for the handheld device with the sliding mechanism The method comprises moving 110, using the sliding mechanism 14, the two input controllers between the retracted configuration and the extended configuration.

The following description relates to the handheld device and to the corresponding method. Features introduced in connection with the handheld device may be introduced into the corresponding method (and vice versa).

Figure 1D:
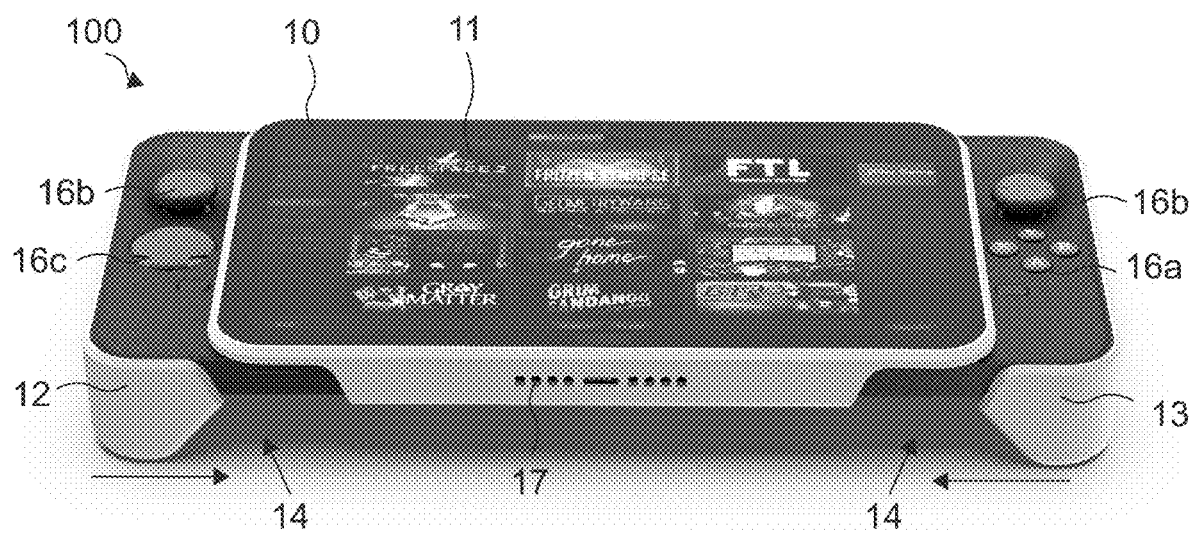
FIGS. 1d and 1e show perspective illustrations of a handheld device a sliding mechanism according to an example.
Figure 1E:
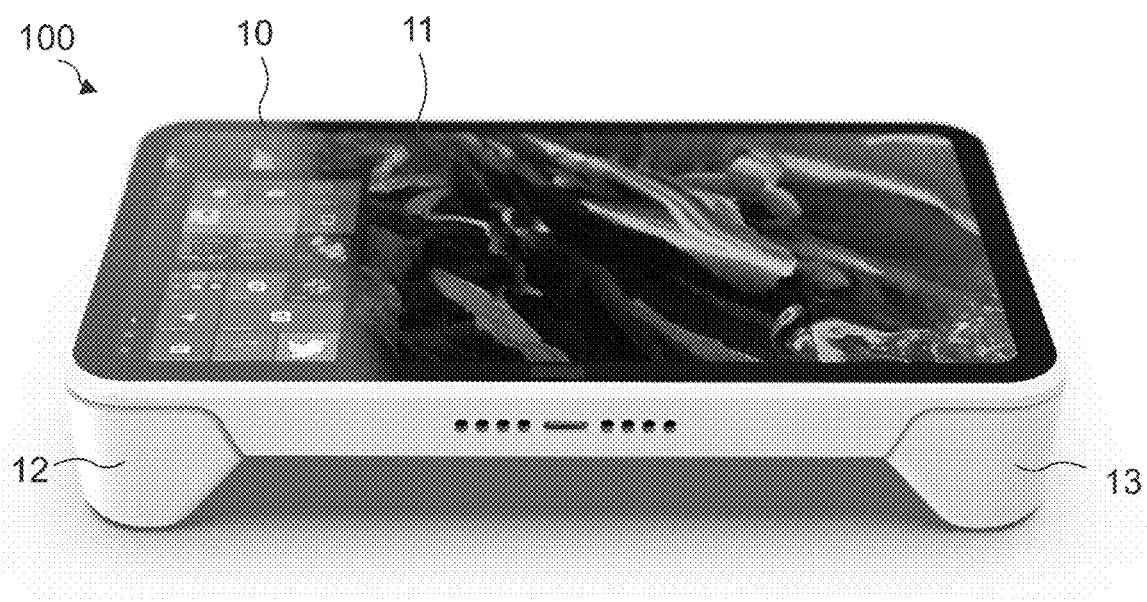

FIGS. 1d and 1e show industrial design renderings of the design of an implementation with a sliding mechanism. FIGS. 1d and 1e show perspective illustrations of a handheld device 100 with an extension mechanism, the extension mechanism being a sliding mechanism 14. FIG. 1a, 1b, 1d and 1e may show a sliding controller design.

In this design, controllers 12; 13 with ergonomic handles for a handheld gaming may slide behind an (approximately) 8-inch screen. In other words, a diagonal size of the display 11 of the main unit 10 may be at least 7 inches and/or at most 9 inches, e.g., approximately 8 inches. When the controllers 12; 13 are pushed inside (into the retracted configuration), the overall size of the system is reduced to match other handheld gaming devices with smaller screens. This may provide very good mobile design to carry with in a backpack. For playing games, controllers (i.e. the two input controllers 12;13) may be slid out. Either one controller can be pushed out or both. For examples the two input controllers 12; 13 may be arranged at two opposing sides of the main unit 10. For example, the two input controllers 12; 13 may be arranged for use with both hands of a user when the handheld device is held in a landscape orientation (i.e., when the handheld device is held such, that a width of the display 11 is greater than its height). The controller position may be linked to the software and UI (as shown in more detail in relation with FIGS. 2a to 2j) to create a seamless user experience. For example, the handheld device may comprise a sensor to detect a change between the retracted configuration and the extended configuration. For example, the sensor may be configured to detect the presence of a magnet or a ferromagnetic material, or to detect an electrical contact between a terminal arranged at the main unit and a terminal arranged at the respective controller. The handheld device may be configured to launch an application launcher (or other software). upon detection of the change to the extended configuration. The method shown in FIG. 1c may accordingly comprise launching 140 an application launcher upon detection of the change to the extended configuration.

The two input controllers 12; 13 may each comprise one or more input devices 16a-c for controlling the handheld device. For example, as can be seen in FIGS. 1a and 1d, the one or more input devices may comprise one or more of a button 16a, a control stick (e.g. a joystick or analog controller) 16b and a D-pad 16c. Other input devices may be used as well, such as touch surfaces. For example, at least one of the two input controllers may comprise a (capacitive) touch surface, or the display 11 may be a touchscreen and be used as input device. As can be seen between FIGS. 1a and 1b and between FIGS. 1d and 1e, at least one input device of each input controller may be covered in the retracted configuration (or, if using a folding design, as shown in FIGS. 6a to 8b, moved to the sides), and uncovered in the extended configuration. Accordingly, the method may comprise uncovering 120 the at least one input device. For example, the at least one input device may be facing the same direction as the display in the extended configuration (e.g., towards the user). The input controllers may comprise further input devices, such as shoulder buttons 16a, that are accessible regardless of the configuration (see e.g. FIG. 2b).

This design may allow for a bigger screen (8-inch or more) experience in an overall smaller system size that is previously obtained at smaller screen sizes. In the carrying mode (i.e. retracted configuration), the controllers may be pushed in (into the retracted configuration), which may protect the buttons as they are not exposed. The controller position may be tied to the user interface, creating a seamless and context-based experience. Ergonomic handles of the controllers may provide a better grip and less stress for long-term playing. In other words, the two input controllers may be shaped to form hand grips for holding the handheld device. As shown in connection with FIGS. 6e and 6f, the input controllers may further comprise recesses for fingers of the user, to improve the ergonomics of the controllers.

Figure 2A:
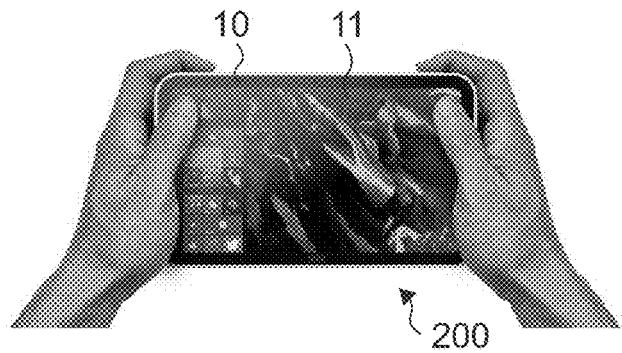
FIGS. 2a to 2j show illustrations of different use cases and configurations of a handheld device with a sliding mechanism according to examples.
Figure 2B:
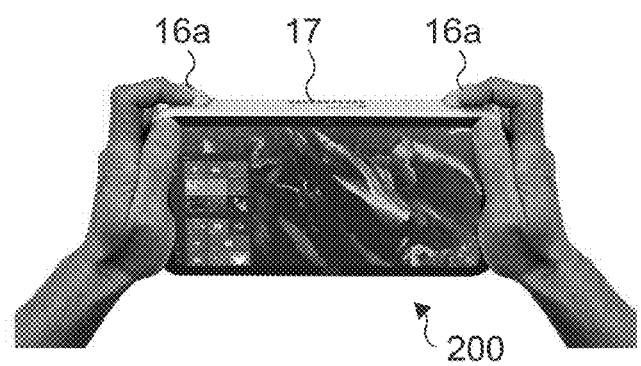
Figure 2C:
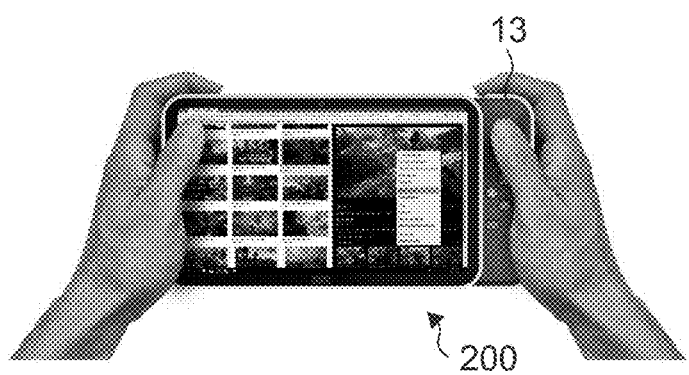

With just one controller 13 pushed out (half slide, as shown in FIG. 2c), typical consumption usage may be enhanced especially for Windows as controller buttons can be used to navigate in addition to touch. A mode with one controller out (half slide) can be used to play games in portrait mode efficiently (see e.g. FIGS. 2e and 2f). The ergonomic shape of the controllers may act as stand for on-table usage (see e.g. FIGS. 2g and 2h). Various examples might not require an additional or separate stand.

More details and aspects of the handheld device and corresponding method are mentioned in connection with the proposed concept or one or more examples described above or below (e.g. FIG. 2a to 9c). The handheld device and the corresponding method may comprise one or more additional optional features corresponding to one or more aspects of the proposed concept or one or more examples described above or below.

FIGS. 2a to 2j show illustrations of different use cases and configurations of a handheld device 200 with a sliding mechanism according to examples. For example, the handheld device 200 may be implemented similar to the handheld device 100 shown in connection with FIGS. 1a to 1e. FIG. 2a to 2j may show new innovative usages achieved through a sliding (or alternatively a folding) controller design. In FIG. 2a a slide-in mode (i.e. retracted configuration)/tablet mode is shown, in which a main screen of the (desktop) operating system is launched and shown on the display 11 of the main unit 10. For example, the handheld device 200 may be usable as a tablet computer or as a display when the two input controllers are in the retracted position. For example, when used as a tablet computer or (touch-screen display), the input device(s) of the input controllers may be covered by the main unit, or face away from the user (e.g., towards the sides of the handheld device).

In FIG. 2b, the handheld device is shown in slide-in mode/tablet mode. In this mode, triggers (e.g. shoulder buttons 16a) may be used to navigate a web browser. For example, the handheld device may be configured to provide a control of an operating system and/or of one or more applications (e.g. web browser, application launcher, game launcher) being installed on the handheld device via the input controllers. Accordingly, the method of FIG. 1c may comprise providing 130 a control of an operating system and/or of one or more applications being installed on the handheld device via the input controllers.

In FIG. 2c, the handheld device 200 is shown in half slide-out mode (i.e. one 12 of the input controllers is in the retracted configuration, the other 13 in the extended configuration), which may be used as browsing mode. For example, half of the controllers may be used for browser navigation in the OS.

Figure 2D:
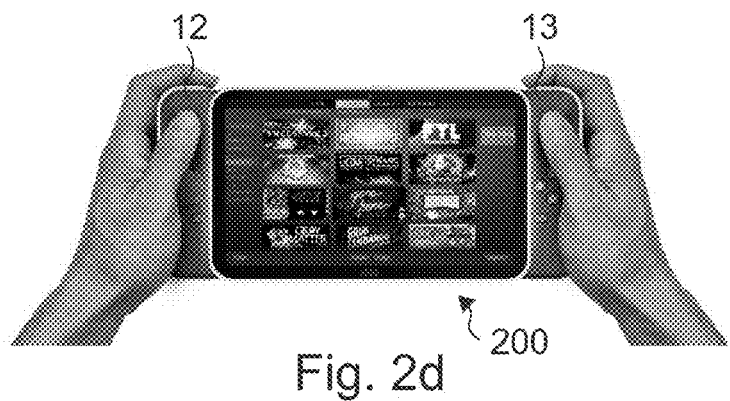

In FIG. 2d, the handheld device 200 is shown in slide-out mode (i.e. both input controllers 12; 13 are moved to the extended configuration)/gaming mode. In this mode, a main screen of a game app may be launched. For example, the handheld device may be suitable for use in a landscape configuration (with the display having a larger (lateral) width than (vertical) height, as held by the user) when the two input controllers are in the extended configuration. In this configuration, immersive gaming may be experienced with a light and ergonomic controller.

Figures 2E, 2F:
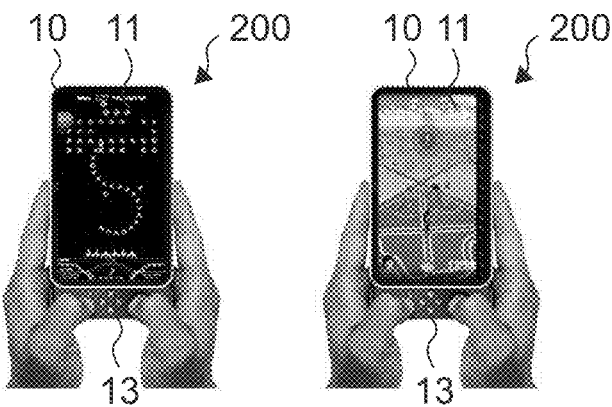

In FIGS. 2e and 2f, the handheld device is shown in half slide-out mode/portrait mode, which may be used as augmented reality (AR) gaming mode. In this mode, the display 11 of the main unit 10 is in a portrait configuration (i.e., the vertical height of the display is larger than the lateral width, as held by the user) In other words, the handheld device may be suitable for use in a portrait configuration when one 12 of the two input controllers is in the extended configuration and the other 13 input controller is in the retracted configuration. For augmented reality applications, a world-facing camera of the handheld device may be used. For example, a world-facing camera may be an outward-facing camera, i.e., a camera that faces away from the user, e.g., that faces in the opposite direction than the display 11. In other words, the handheld device may comprise a world-facing camera 19 (i.e. world-facing camera means), as shown in FIGS. 4a to 4d, for example.

Figures 2G, 2H:
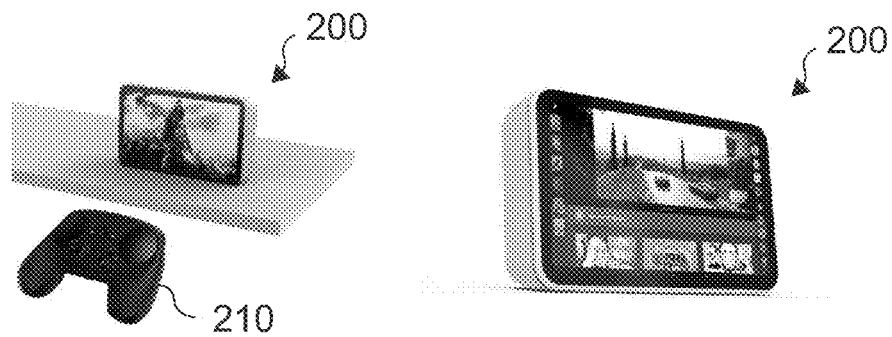
Figures 2I, 2J:
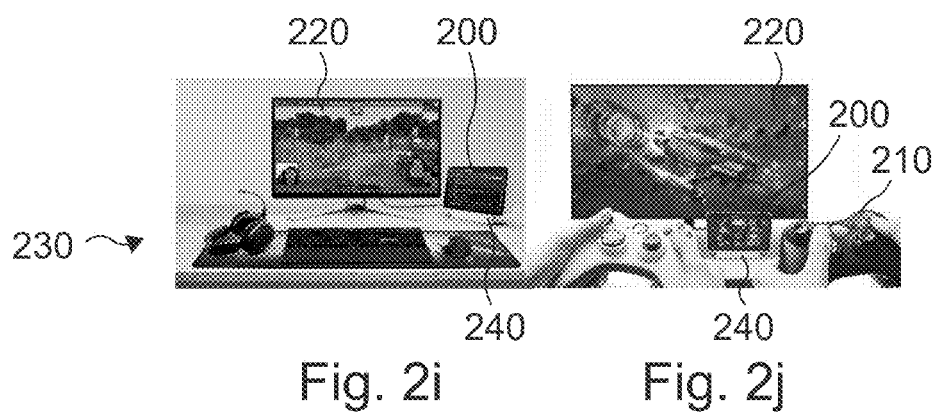

In FIGS. 2g an 2h, the handheld device is shown in slide-in mode/stand mode, i.e. the handheld device rests on the two input controllers (and the main unit), at a slight angle. For example, an external (wireless) game controller 210 may be connected to the handheld device 200. In FIGS. 2i and 2j, the handheld device 200 is shown in a full gaming setting, for group playing, for example with an active cooling dock 240, keyboard, mouse 230 or game controller 210 and monitor 220. In FIGS. 2g and 2h, the display 11 of the main unit is non-orthogonal to the surface the handheld device is placed on. Instead, the controllers 12; 13 are slightly slanted, such that the handheld device appears to be reclined. For example, as shown in the Figures, the input controllers may comprise a longitudinal form. At least one terminal of the longitudinal form (e.g., the "bottom", or downward-facing terminal when the handheld device is placed on a surface) may have an angle unequal 90° with respect to a surface along the longitudinal extent of the controller (or component), so that, when the handheld device is deposited on a surface via the respective terminal, the display comprises an angle of unequal 90° to the surface (the handheld device is placed on). In other words, as the surface of the terminal is non-orthogonal to the surface along the longitudinal extent of the controller, the handheld device is slanted (or reclined), e.g., with an angle of greater than 90% (or smaller than 90%, depending on the viewpoint) between the surface the handheld device is placed on, and the display 11 of the handheld device.

More details and aspects of the handheld device are mentioned in connection with the proposed concept or one or more examples described above or below (e.g. FIG. 1a to 1e, 3a to 9c). The handheld device may comprise one or more additional optional features corresponding to one or more aspects of the proposed concept or one or more examples described above or below.

Figure 3:
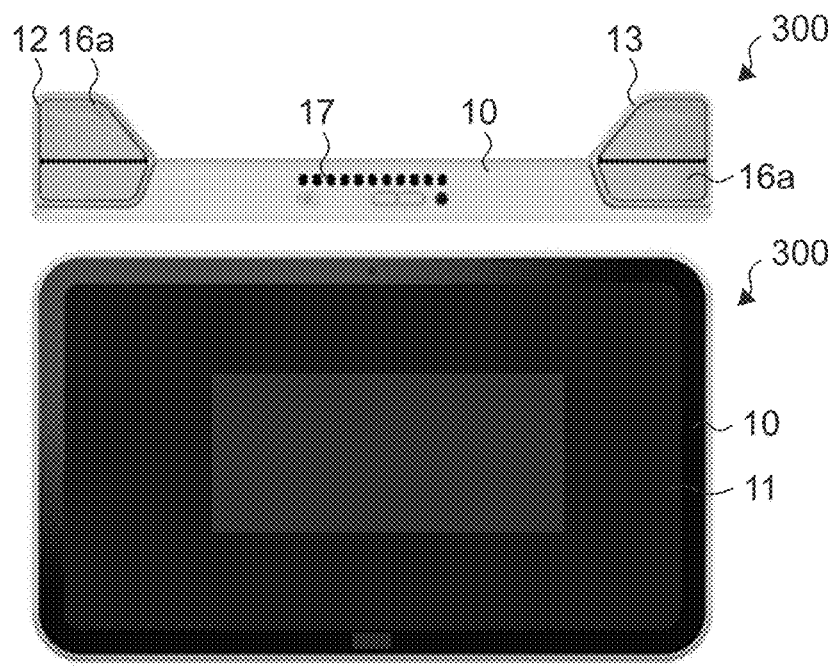
FIG. 3 shows a schematic illustration of an example of a handheld device with an eight-inch, sixteen by nine display.

FIG. 3 shows a schematic illustration of an example of a handheld device 300 with an eight-inch, sixteen by nine display 11. For example, the handheld device 300 may be implemented similar to at least one of the handheld devices 100; 200 of FIGS. 1a to 2j. Examples may provide a compact device size with slide-in (or fold-in) controllers 12; 13 for mobility. In FIG. 3, additionally, a cooling vent 17 is shown, which is shown in more detail in connection with FIGS. 4a to 4e. In an exemplary implementation, a size of a 197 mm by 120 mms was used to accommodate an 8-inch screen, with a thickness of 14-19 mm (in the middle) or 38.4 mm (with the controllers/handles included). The compactness may lead to a high mobility of the concept.

More details and aspects of the handheld device are mentioned in connection with the proposed concept or one or more examples described above or below (e.g. FIG. 1a to 2g, 4a to 9c). The handheld device may comprise one or more additional optional features corresponding to one or more aspects of the proposed concept or one or more examples described above or below.

Figure 4A:
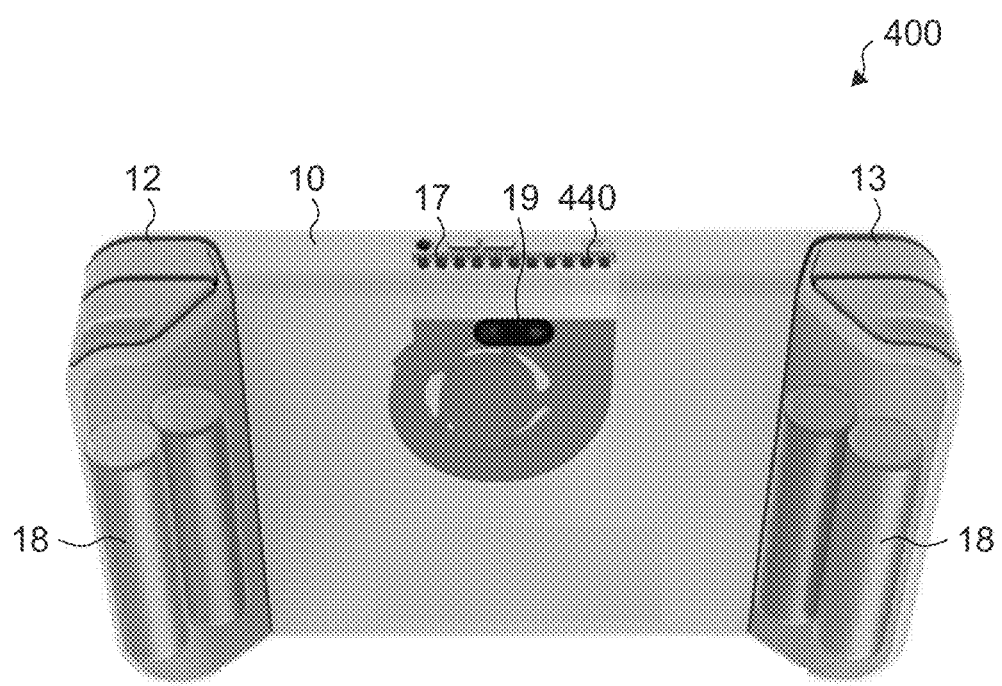
FIGS. 4a to 4g show illustrations of batteries and of a cooling system of an example of a handheld device with an extension mechanism.

FIGS. 4a to 4g show illustrations of batteries and of a cooling system of an example of a handheld device 400 with an extension mechanism that is a sliding mechanism. For example, the handheld device 400 may be implemented similar to at least one of the handheld devices 100; 200; 300 of FIGS. 1a to 3. In FIG. 4a, a placement of a cooling fan 440 in the main unit is shown. Furthermore, a placement of batteries 18, such as single-use batteries, rechargeable batteries, to rechargeable lithium-ion battery packs. within the controllers is shown. For example, a balanced weight distribution may be obtained with two batteries 18 integrated in each controller 12; 13. A user experience study has found a preference for weight distributed towards the controllers. A sliding or folding controller arch allows that by putting batteries (which may contribute approximately $\frac{1}{3}^{rd}$ of system weight) into the controllers 12; 13. In other words, the two input controllers 12; 13 may each (or only one of them) comprise at least one battery 18 or battery compartment (18a, as shown in FIG. 6f, for example) of the handheld device. In FIG. 4a, the handheld device is shown with two batteries 18 in each controller 12; 13. FIGS. 4a to 4d further show the handheld device 400 comprising an optional world-facing camera 19 at a back of the main unit 10.

Figure 4B:
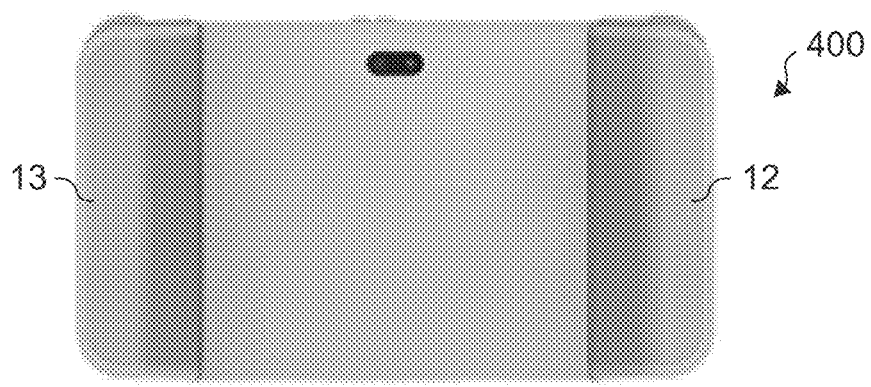
Figure 4C:
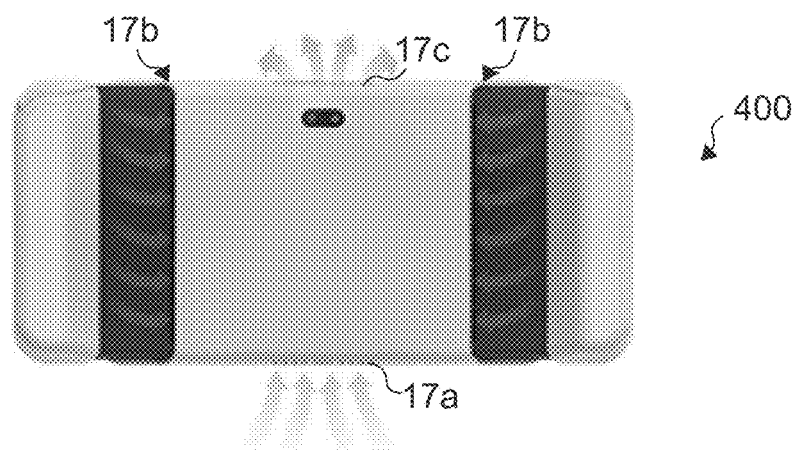
Figure 4D:
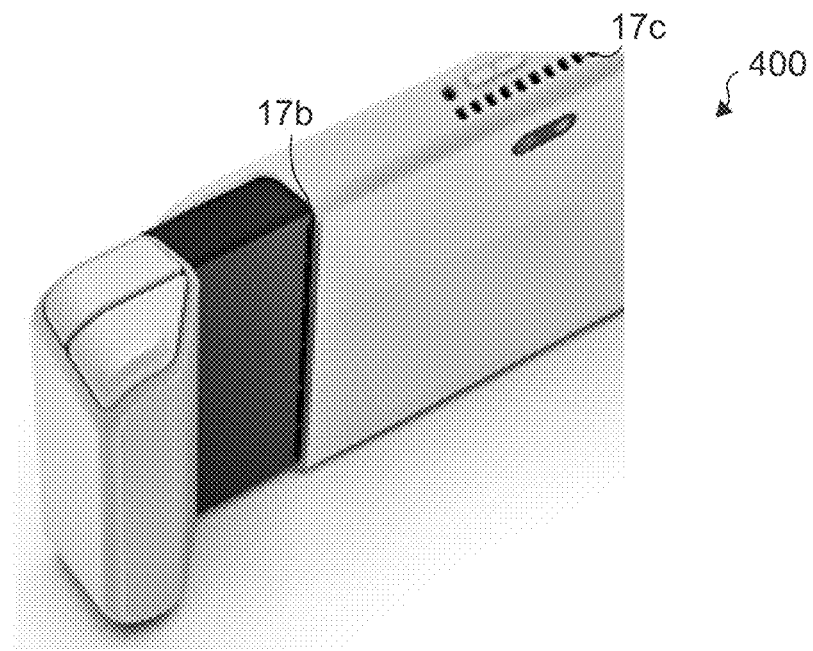

In FIGS. 4b to 4d, the thermal management, e.g., the airflow, is shown, where, in the slide-out (i.e. extended) mode, more vents 17b are being opened (at the sides) for performing high performance gaming. In other words, one or more cooling vents 17b are uncovered in the extended configuration. For example, the method shown in FIG. 1c may comprise uncovering 120 the one or more cooling vents in the extended configuration. The handheld device according to one of the claims 1 to 8, wherein one or more cooling vents 17b are uncovered in the extended configuration.

The thermal vents 17b may be hidden behind the controller when pushed in (i.e. in retracted configuration) and only exposed when controllers are pushed out (i.e. in extended configuration). In FIG. 4d, it is shown how the slide-out mode/gaming mode allows for good air flow to support high-end gaming. For example, the cooling vents 17b may be used in addition to a bottom inlet 17a and an exhaust 17c at the top, as shown in more details in FIG. 4f.

Figure 4E:
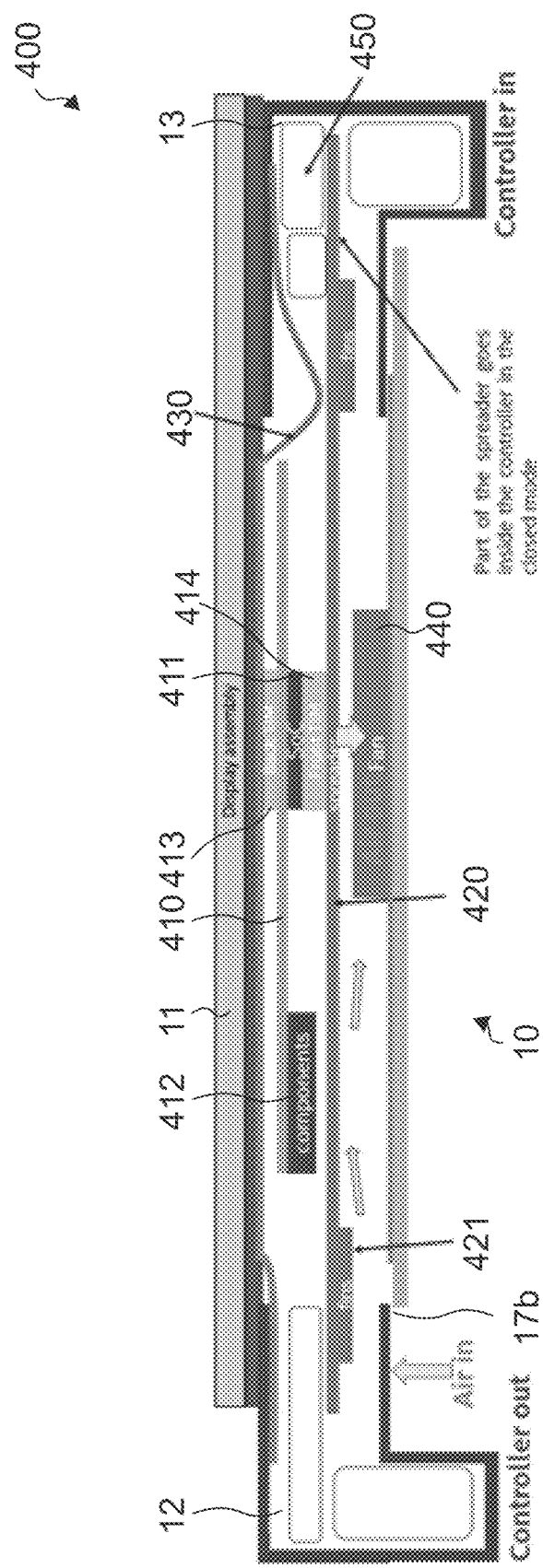
Figure 4F:
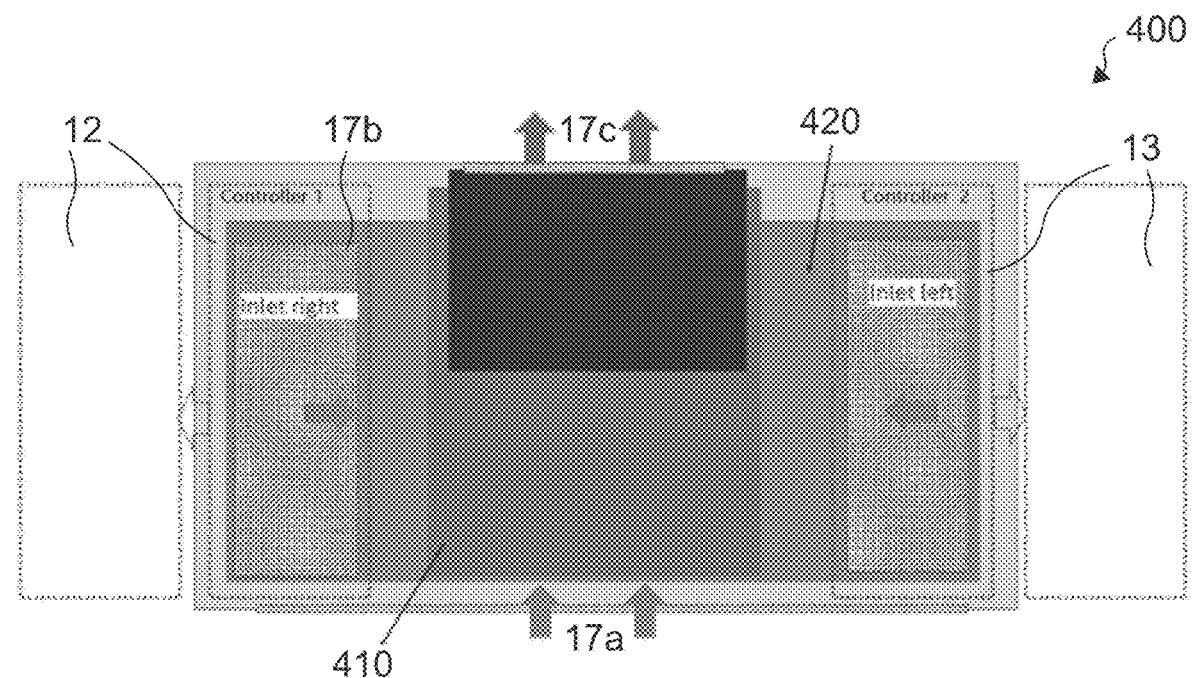
Figure 4G:
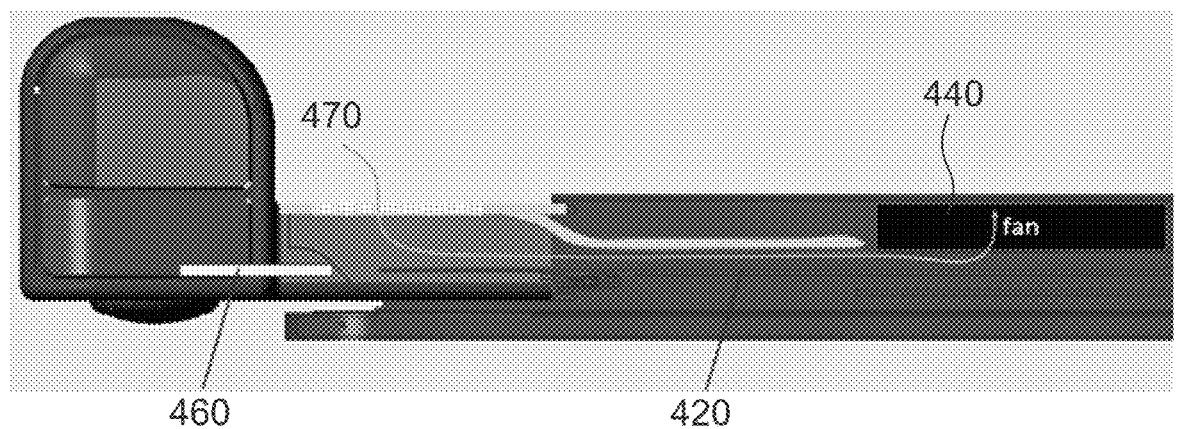

In FIGS. 4e to 4g, an exemplary thermal/system arch for the handheld device is shown. On the left side (of FIG. 4e), one 12 of the input controllers is out (i.e. in the extended configuration, letting air into the device (through vent 17b). On the right side, the input controller 13 is in (i.e. retracted). In the example of FIGS. 4e to 4g, the handheld device comprises a narrow circuit board 410, which hosts the System on Chip (SoC) 411 and additional components 412. The SoC 411 is thermally coupled to a heat spreader 420 via front Thermal Interface Material (TIM 414) and to a flexible graphite spreader 430 via back TIM 413. The heat spreader 420 comprises fins 412. In FIG. 4e, the handheld device further comprises the fan 440. Within the device, the fins 421 may be attached to the high-efficiency thermal spreader 420 that is in contact with the System-on-Chip 411 via a thermal interface material 414. Part of the spreader goes inside the controller 12; 13 in the closed (retracted) mode (as shown on the right for controller 13). The extended flexible graphite spreader 430 is partially attached to the frame of the main unit 10 and partially to the controller(s) 12; 13. FIG. 4e further shows further components 450 of the controller 13. Air is conducted into the device through the cooling vents 17b, along the fins 421 of the spreader 420 and towards the fan 440, which pushes the air out through the exhaust (as shown in FIG. 4f).

In FIG. 4f, the envisioned flow of the air is shown according to an example, with a bottom inlet 17a and a top exhaust 17c, and with inlets 17b right and left that are exposed when the controllers 12; 13 are in the extended configuration. A narrow-width board 410 of the main unit 10 is arranged in the center. A light-weight high-efficiency thermal spreader 420 is used. In FIG. 4g, a channeling of the air flow inside the system is shown. The incoming airflow 470 is channeled to go over the high-efficiency spreader 420. The controllers may have cut-outs 460 to occupy the spreader when the controllers are pushed in (i.e. in retracted configuration).

The schematic in FIG. 4e shows an exemplary thermal and system architecture for the sliding controller design. Because controllers occupy system volume when pushed in, the architecture focuses on using a narrow board 410 as shown in FIGS. 4e and 4f. The board might not be extended in the controller space but there may be a small cut out in the controllers as shown in FIG. 4g which accommodates extended high efficiency silicon spreader 420 even when controllers 12; 13 are pushed in. This extension of the spreader 420 allows utilization of lateral (i.e. x-y) area for the spreader, thus not requiring a heavy heat sink to be used creating light weight thermal solution. Also, this type of thermal architecture may extend passive spreading, requiring less fan usage leading to a quieter system. FIG. 4g also shows that the incoming air flow 470 is ducted over the spreader 420 effectively in order to increase heat transfer between the spreader and air.

More details and aspects of the handheld device are mentioned in connection with the proposed concept or one or more examples described above or below (e.g. FIG. 1a to 3, 5a to 9c). The handheld device may comprise one or more additional optional features corresponding to one or more aspects of the proposed concept or one or more examples described above or below.

Figure 5A:
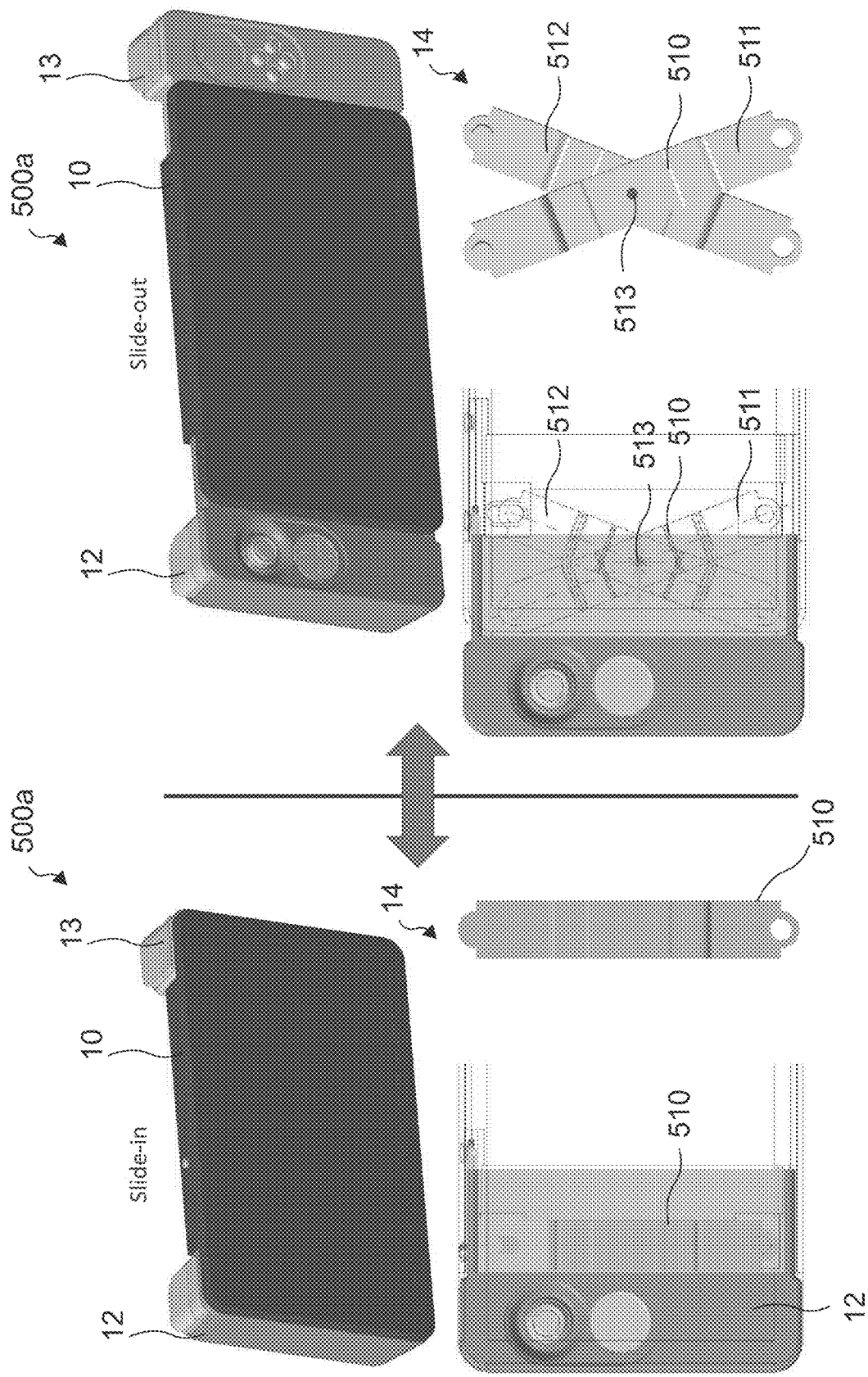

In FIGS. 5a to 5d, various mechanisms for supporting the sliding motion of the controllers are shown. The handheld device 500a-500d shown in FIGS. 5a to 5d may be implemented similar to at least one of the handheld devices 100; 200; 300; 400 of FIGS. 1a to 4g. FIGS. 5a to 5d show schematic illustrations of various implementations of a handheld device with a sliding mechanism 14. FIG. 5a shows a handheld device 500a with a "scissor" mechanism 510 on both the left and right side of the system to implement the sliding mechanism 14. In other words, the sliding mechanism 14 may be implemented by a scissor mechanism. The scissor blades 511; 512 control the movement of the controllers 12; 13 as they translate between Slide-in (retracted) and Slide-out (extended) positions (with the slide-in position shown on the left and the slide-out position shown on the right). The two scissor blades pivot to each other at the middle 513. The blades 511; 512 extend into the scissor form (shown on the right) to support the controllers as they slide out. The two blades 511; 512 collapse over each other as the controllers slide in (shown on the left). On the left, the scissor sliding mechanism 510 is shown as the scissor collapses for the controller(s) to slide in (i.e. retracted configuration). On the right, the scissor sliding mechanism 510 is shown as the scissor extends for the controller(s) to slide out (i.e. extended configuration).

Figure 5B:
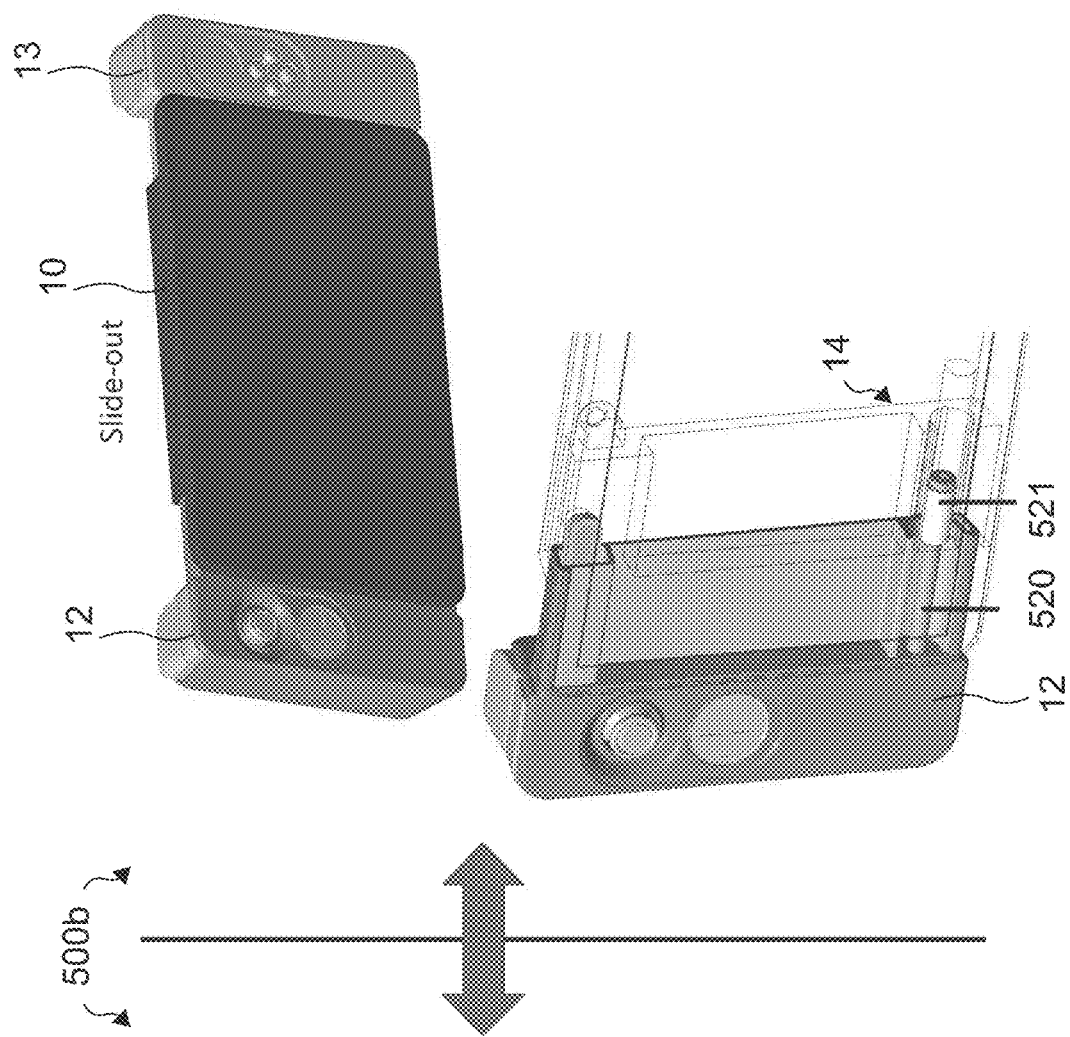
Figure 5B:
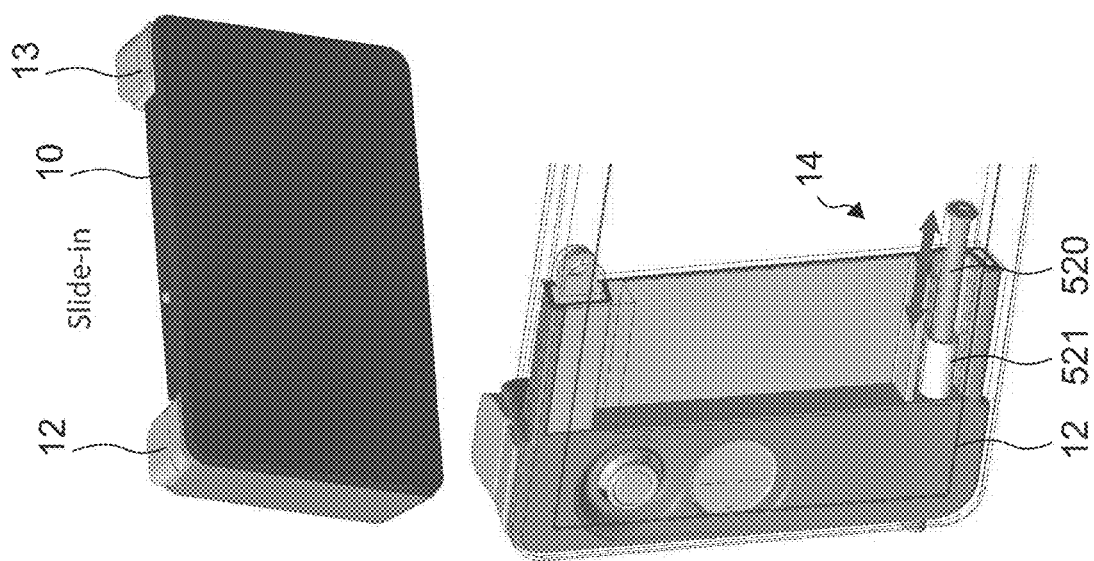

FIG. 5b shows a handheld device 500b with a bearing 520 and guide 521 mechanism on both the left and right side of the system to implement the sliding mechanism 14. In other words, the sliding mechanism 14 may be implemented by bearings and guides. The bearing 520 and guide 521 control the movement of the controllers as they translate between Slide-in (shown on the left) and Slide-out (shown on the right) positions. The guide 521 is affixed to the body (i.e., the main unit 10), it provides the channel for the bearing 520 to slide in and out as the controllers 12; 13 move to the intended positions. On the left, the bearing is slid in on the guide. On the right, the bearing is slid out on the guide for controllers to slide out.

In various examples, the extension mechanism comprises a mechanical 530; 531 or magnetic 541 component, such as a locking mechanism, for retaining the input controllers in the retracted configuration. FIG. 5c shows a handheld device 500c with a locking mechanism on both the left and right sides of the system (i.e. for both controllers). For example, the locking mechanism may be configured to retain the input controllers in the retracted (or extended) configuration. The locking mechanism comprises a spring steel part (latch) 530 with an elevated portion 531 that catches and locks the controllers in place. For example, the elevated portion 531 may lock at two positions 532 (for slide-out) and 533 (for slide-in) (e.g., cut-outs in the main unit 10). The user may push (the elevated portion 531) and defeat the lock to move between the Slide-in (i.e. retracted) and Slide-out (i.e. extended) positions.

Figure 5D:
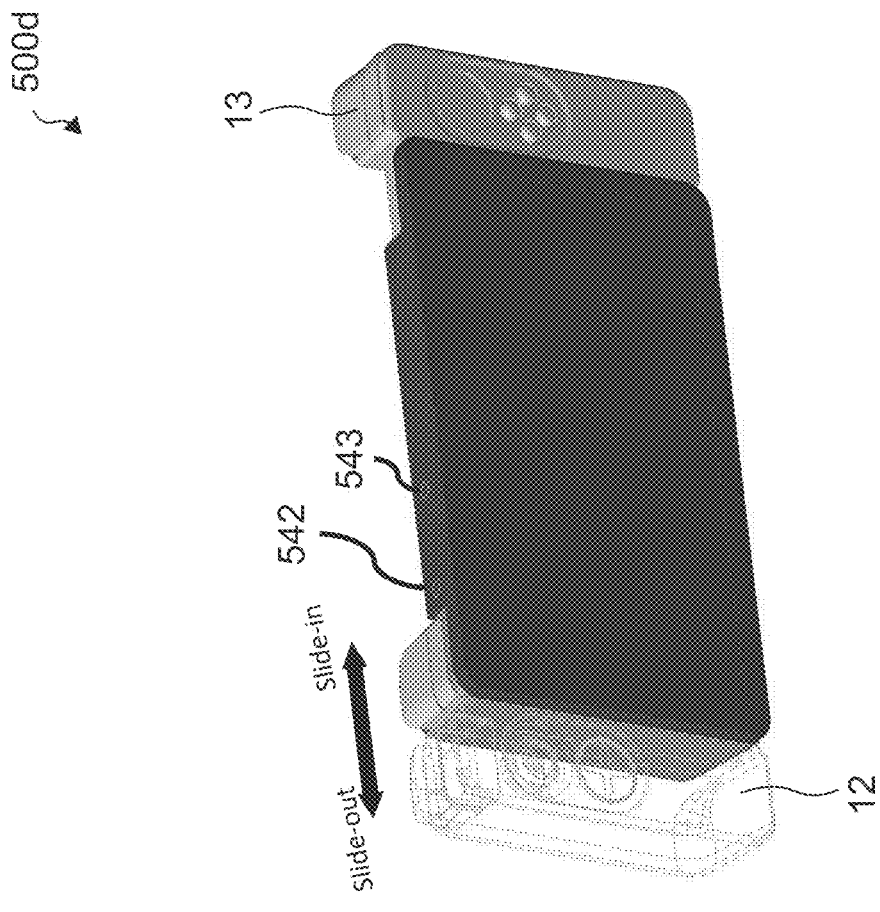
Figure 5D:
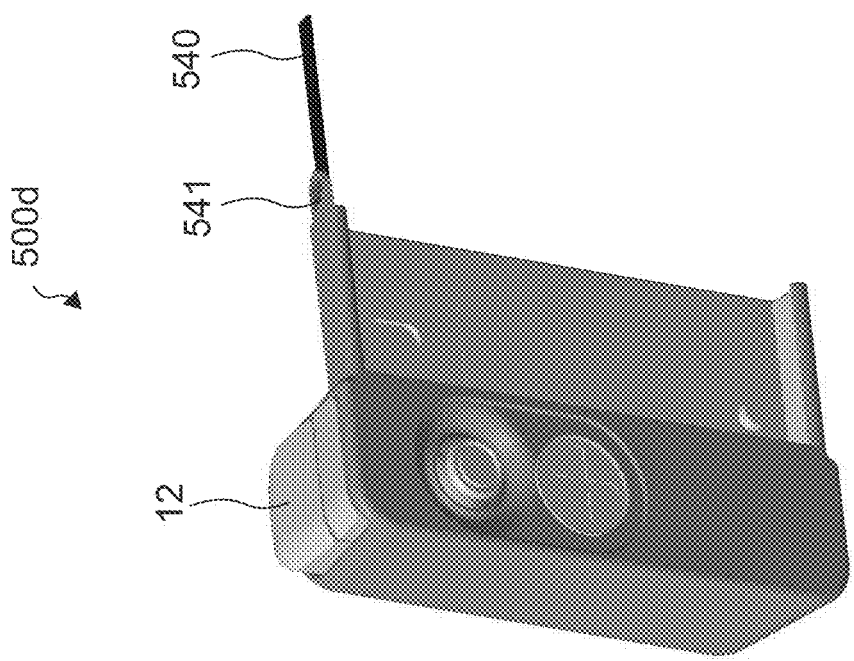

FIG. 5d shows another variation of a handheld device 500d with a locking mechanism using magnets on both the left and right sides of the system. For example, the locking mechanism may be configured to retain the input controllers in the retracted (or extended) configuration. A ferrous steel plate 540 may be arranged in the system (e.g. mechanically coupled to the controllers or the main unit). When aligned with magnets 541 (that are placed on the controllers and/or on the main unit), the attraction force may lock the controllers in place. The user may apply force to defeat the lock to move between the Slide-in and Slide-out positions. The right side of FIG. 5d shows the position 542 of the magnet lock for slide-out, and the position 543 of the magnet lock for slide-in. Other components are omitted from FIGS. 5c and 5d for clarity.

More details and aspects of the handheld device are mentioned in connection with the proposed concept or one or more examples described above or below (e.g. FIG. 1a to 4g, 6a to 9c). The handheld device may comprise one or more additional optional features corresponding to one or more aspects of the proposed concept or one or more examples described above or below.

In FIGS. 1a to 5d, a handheld device with a sliding mechanism was shown. In FIGS. 6a to 8b, however, a handheld device with a folding mechanism is shown.

Figure 6A:
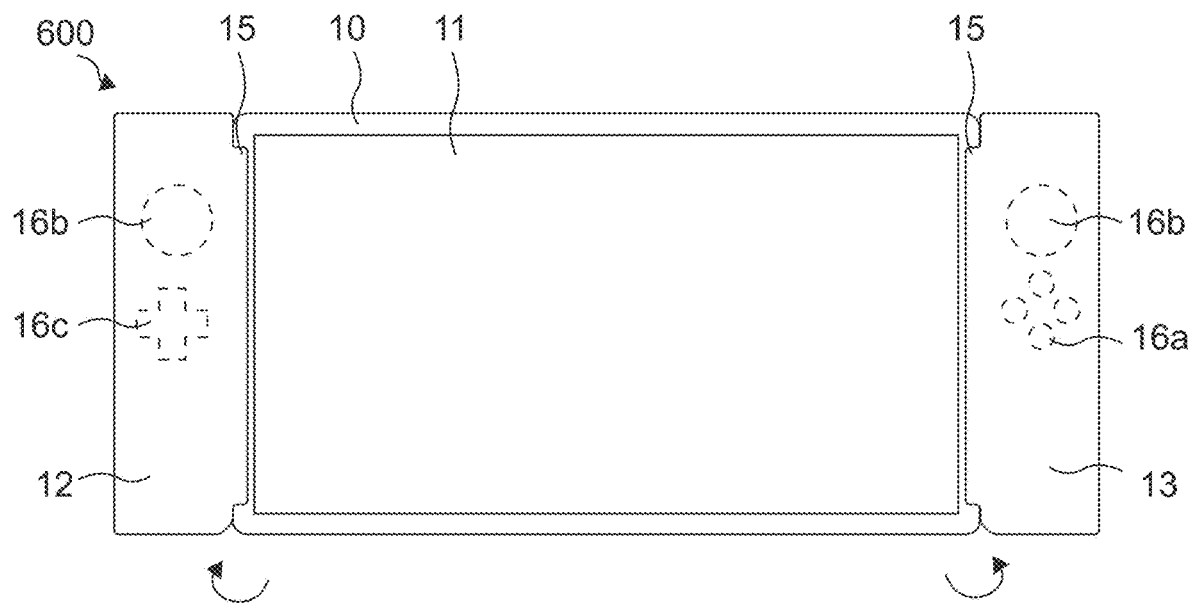
FIGS. 6a and 6b show illustrations of an example of a handheld device with an extension mechanism, the extension mechanism being a folding mechanism.
Figure 6B:
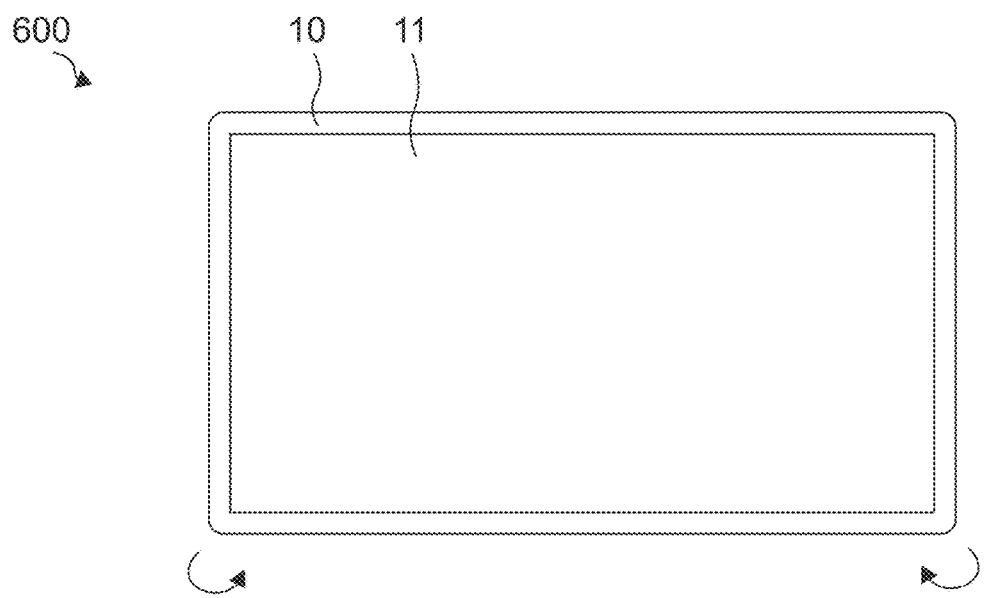

FIGS. 6a and 6b show illustrations of an example of a handheld device 600 with an extension mechanism, with the extension mechanism being a folding mechanism. For example, the handheld device 600 may be implemented similar to at least one of the handheld devices 100; 200; 300; 400; 500a-d shown in connection with FIGS. 1a to 5d, with a folding mechanism being used instead of a sliding mechanism. The handheld device 600 comprises a main unit comprising a display 11 of the handheld device. The handheld device 600 comprises two input controllers 12; 13 being non-removably attached to the main unit via the folding mechanism 15. The folding mechanism is configured such, that the two input controllers are movable from a retracted configuration to an extended configuration.

Figure 6C:
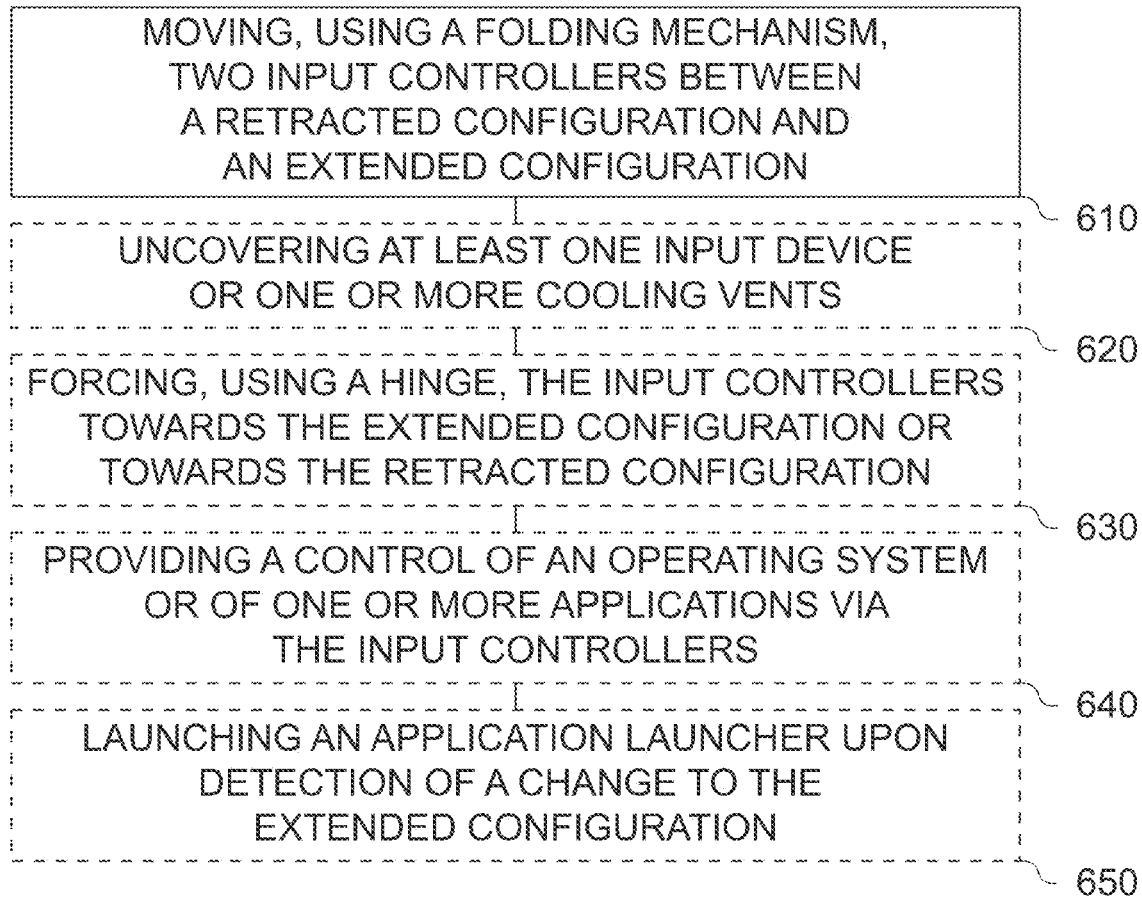
FIG. 6c shows a flow chart of an example of a method for a handheld device with a folding mechanism.

FIG. 6c shows a flow chart of an example of the corresponding method for the handheld device with the folding mechanism. The method further comprises moving 610, using the folding mechanism, the two input controllers between a retracted configuration and an extended configuration. For example, the method may be implemented similar to the method shown in connection with FIG. 1c.

The following description relates to the handheld device and to the corresponding method. Features introduced in connection with the handheld device may be introduced into the corresponding method (and vice versa).

As is evident from FIG. 6a, where the handheld device is shown in the extended configuration, and FIG. 6b, where the handheld device is shown in the retracted configuration, the two input controllers 12, 13 may be arranged at two opposing sides of the main unit, e.g., at the left and right side of the main unit. Also, similar to the handheld devices shown in connection with FIGS. 1a to 5d, the two input controllers may each comprise one or more input devices 16 for controlling the handheld device, such as one or more of a button 16a, a control stick 16b and a D-pad 16c. As is evident from the comparison, at least one input device of each input controller may be uncovered in the extended configuration. In this context, the term "uncovered" may indicate, that the respective input device(s) face towards the user, similar to the display. In other words, the at least one input device may be facing the same direction as the display in the extended configuration. Correspondingly, the method may comprise uncovering 620 at least one input device in the extended configuration. In some examples, the handheld device may further comprise a world-facing camera, e.g., as shown in FIGS. 4a to 4d.

Similar to the handheld devices shown in connection with FIGS. 1a to 5d, and in particular in connection with FIGS. 2a to 2j, the handheld device 600 is also suitable for use in both portrait and landscape configuration. For example, the handheld device may be suitable for use in a landscape configuration when the two input controllers are in the extended configuration, and/or suitable for use in a portrait configuration when one of the two input controllers is in the extended configuration and the other input controller is in the retracted configuration. Furthermore, the input controllers and/or sensors for detecting the retracted or extended state may be used for controlling the handheld device, e.g., as shown in connection with FIGS. 2a to 2j. For example, the handheld device is configured to provide a control of an operating system and/or of one or more applications being installed on the handheld device via the input controllers. Accordingly, the method of FIG. 6c may comprise providing 640 a control of an operating system and/or of one or more applications being installed on the handheld device via the input controllers. Additionally or alternatively, the handheld device may comprise a sensor to detect a change between the retracted configuration and the extended configuration. The handheld device may be configured to launch an application launcher upon detection of the change to the extended configuration, and the method of FIG. 6c may comprise launching 650 an application launcher upon detection of the change to the extended configuration.

Figure 6D:
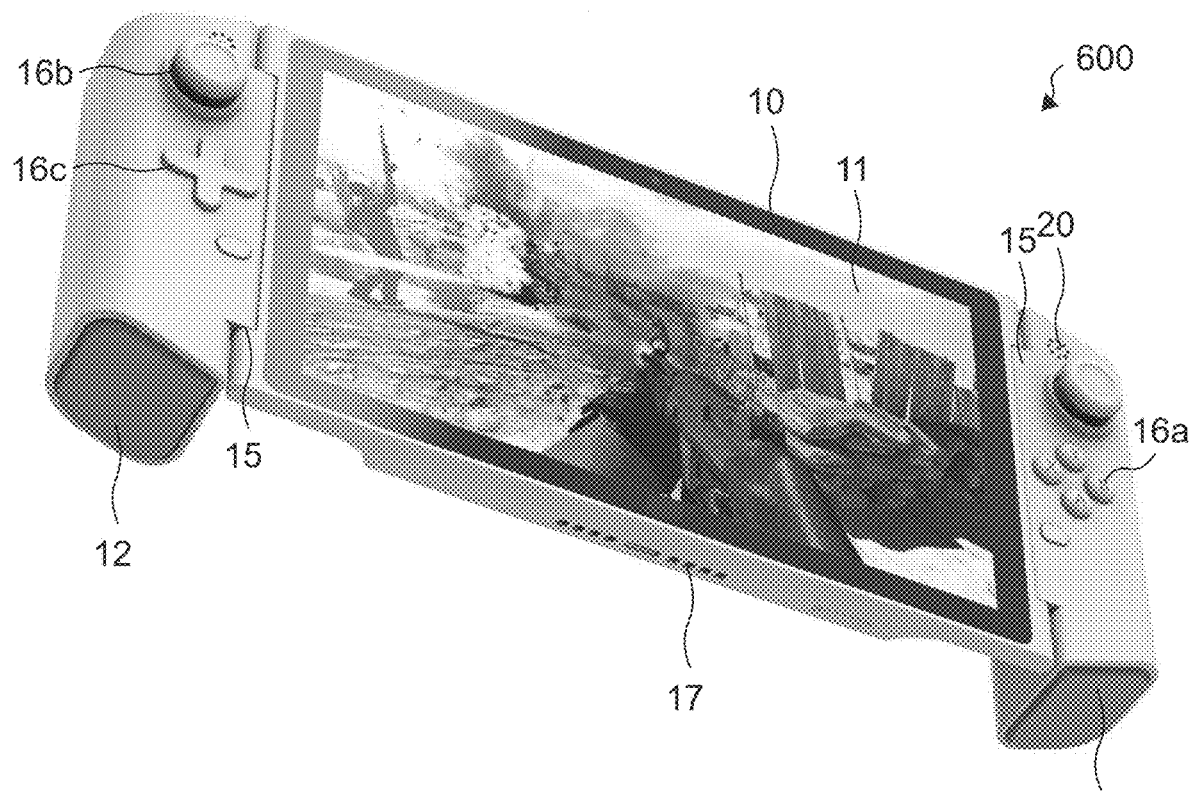
FIGS. 6d to 6g show perspective illustrations of a handheld device with a folding mechanism according to an example.
Figure 6E:
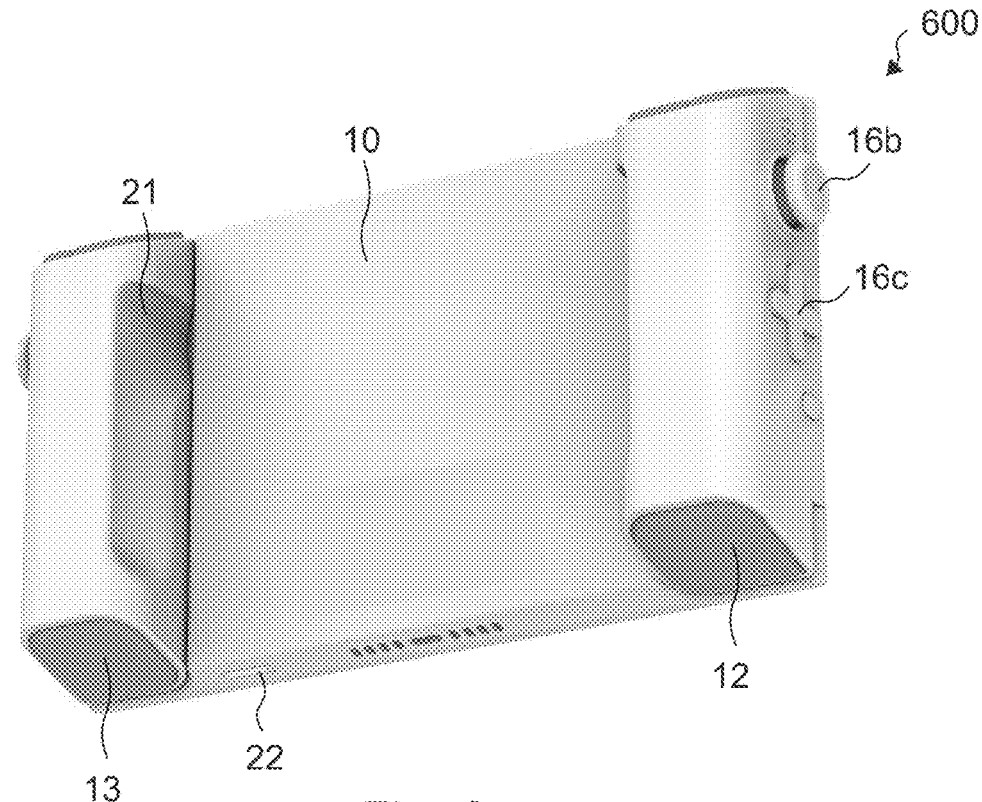
Figure 6F:
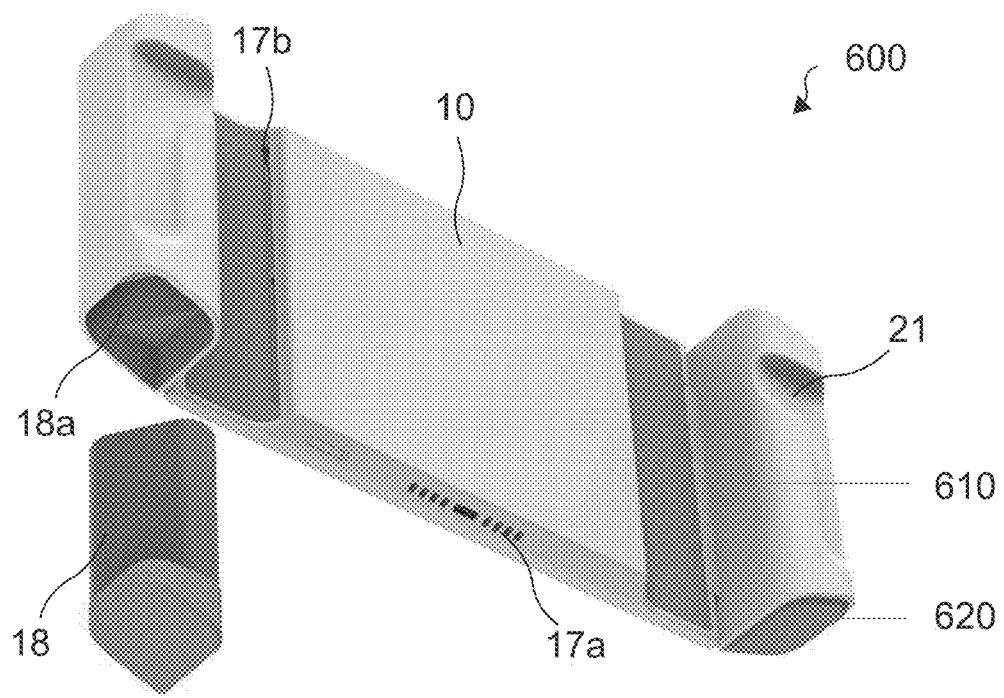

FIGS. 6d to 6g show perspective illustrations of the handheld device 600 with an extension mechanism that is a folding mechanism. In FIG. 6d, the handheld device is shown from the front, in the extended configuration. For example, as shown in FIG. 6d, the handheld device may be a handheld gaming device. As shown in FIGS. 6c to 7d, the handheld device may comprise speakers 20 (which may likewise be included in the handheld devices shown in connection with FIGS. 1a to 5d) In FIG. 6e, the handheld device is shown from the back, in the retracted configuration. In general, the two input controllers 12; 13 may be shaped to form hand grips for holding the handheld device.

As shown in FIGS. 6e and 6f, the controllers may comprise recesses 421 that improve the ergonomics of the controllers as they are held by the user.

Figure 6G:
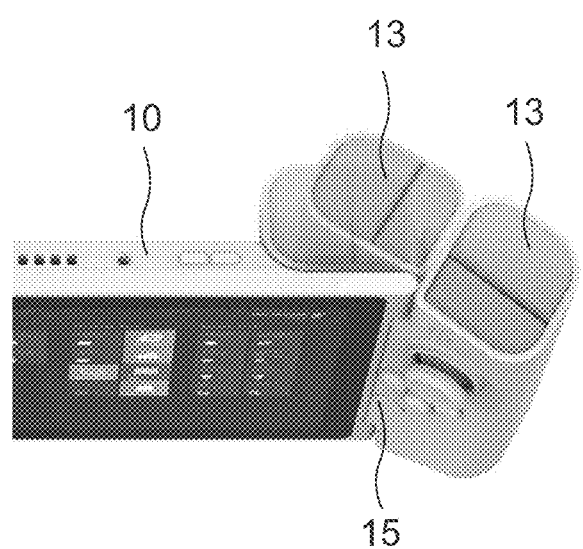

In FIG. 6f, the handheld device is shown from the back, in the extended configuration. In FIG. 6f, the side-inlet vent 17b that is revealed (i.e., uncovered) in the extended configuration is visible. Accordingly, the handheld may comprise one or more cooling vents 17/17a-c. One or more cooling vents 17b may be covered in the retracted configuration, and uncovered in the extended configuration. For example, the method of FIG. 6c may comprise uncovering 620 at least one input device and/or one or more cooling vents in the extended configuration. The controllers may provide a soft touch 610 at the sides for a secure finger grip, and a soft touch 620 at the bottom for the palm. A hot-swappable battery 18 may be inserted/slid in the (e.g. each) controller (e.g., into a battery compartment 18a). In other words, one of the input controllers may, or the two input controllers may each, comprise at least one battery 18 of the handheld device, or a battery compartment 18a of the handheld device. For example, 2×18 mm D batteries may be used. In some cases, the battery may be applied on only one side. In FIG. 6g, the movement between extended configuration and retracted configuration (around the hinge 15) is shown.

More details and aspects of the handheld device and the corresponding method are mentioned in connection with the proposed concept or one or more examples described above or below (e.g. FIG. 1a to 5d, 7a to 9c). The handheld and the method may comprise one or more additional optional features corresponding to one or more aspects of the proposed concept or one or more examples described above or below.

Figure 7A:
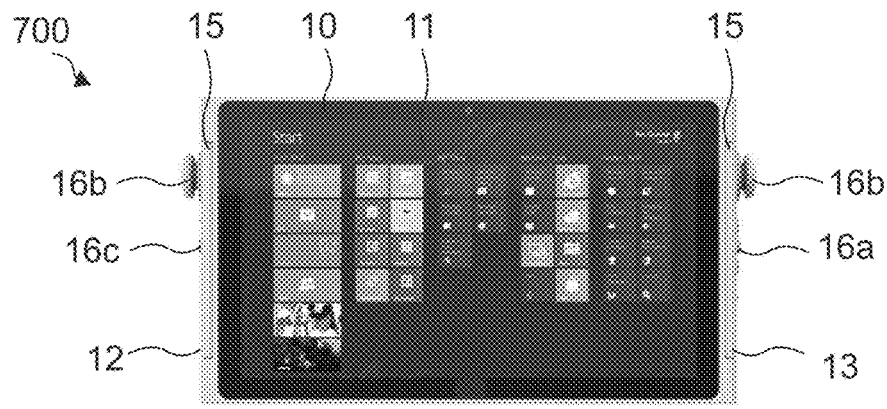
FIGS. 7a to 7c show illustrations of different use cases and configurations of an example of a handheld device with a folding mechanism.
Figure 7B:
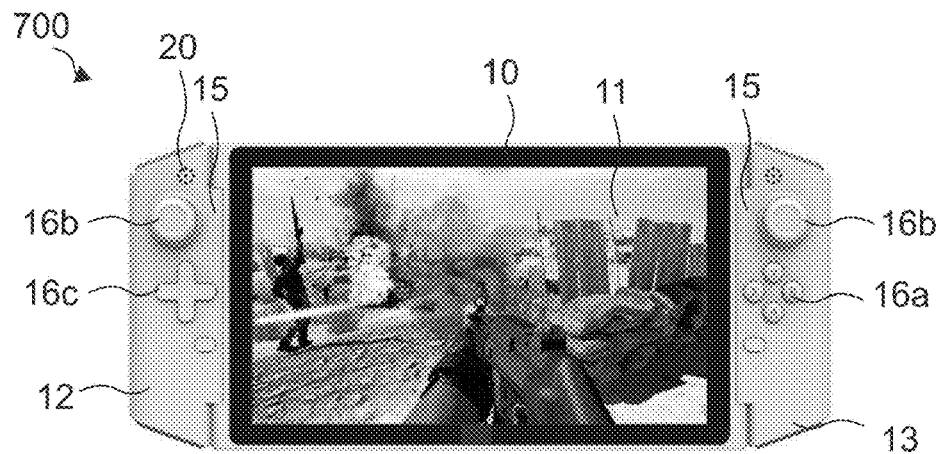
Figure 7C:
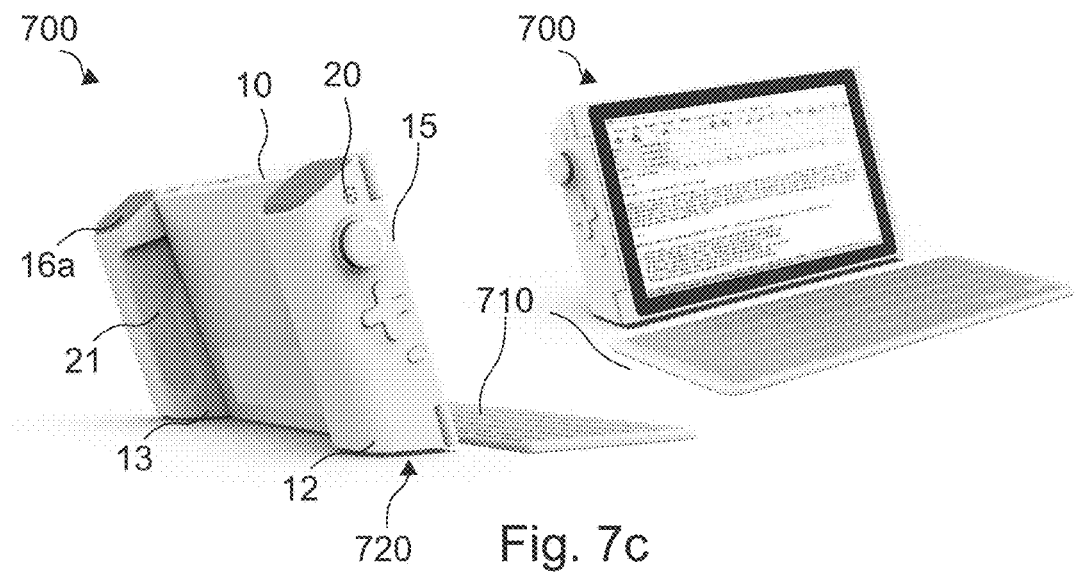

FIGS. 7a to 7c show illustrations of different use cases and configurations of an example of a handheld device 700 with a folding mechanism 15. For example, the handheld device 700 may be implemented similar to at least one of the handheld devices 100; 200; 300; 400; 500ad; 600 shown in connection with FIGS. 1a to 6g, with a folding mechanism being used instead of the sliding mechanism used in FIGS. 1a to 5d. FIGS. 7a to 7c show different usage modes of the folding concept of FIGS. 6a to g. In FIG. 7a, the handheld device is shown in fold-in mode (tablet mode), where the main screen of the operating system (e.g. Microsoft Windows 10) can be shown. In FIG. 7b, the handheld device is shown in fold-out mode (gaming mode), where a main screen of a game app may be launched. Immersive gaming may be experienced with a light and ergonomic controller. In FIG. 7c, the handheld device is shown in a fold-in mode (stand mode), where the handheld device may be used for content consumption in tablet mode (e.g. with an external keyboard 710). As shown in FIG. 7c, when the handheld device is put into stand mode, it may be at an uneven angle relative to the surface it is standing on. In other words, the input controllers may comprise a longitudinal form, with at least one terminal 720 of the longitudinal form having an angle unequal 90° (i.e. uneven, e.g. at most 85 degrees) with respect to a surface along the longitudinal extent of the controller (component), so that, when the handheld device is deposited on a surface via the respective terminal 720, the display comprises an angle of unequal 90° to the surface. For example, as shown in FIGS. 7a and 7c, the handheld device may be usable as a tablet computer (FIG. 7a) or as a display (FIG. 7c) when the two input controllers are in the retracted position.

More details and aspects of the handheld device are mentioned in connection with the proposed concept or one or more examples described above or below (e.g. FIG. 1a to 6g, 8a to 9c). The handheld device may comprise one or more additional optional features corresponding to one or more aspects of the proposed concept or one or more examples described above or below.

Similar to the handheld device with the sliding mechanism, the folding mechanism may comprise a mechanical or magnetic component for retaining the input controllers in the retracted configuration. FIG. 8a shows a schematic illustration of a handheld device 800 with a folding mechanism 15. For example, the handheld device 800 may be implemented similar to at least one of the handheld devices 100; 200; 300; 400; 500a-d; 600; 700 shown in connection with FIGS. 1a to 7c, with a folding mechanism being used instead of the sliding mechanism used in FIGS. 1a to 5d. The extension mechanism may be a folding mechanism comprising a hinge 15. The hinge 15 may be configured such, that the input controllers are mechanically forced towards the extended configuration or towards the extended configuration. Correspondingly, the method of FIG. 6c may comprise mechanically forcing 630, using the hinge, the input controllers towards the extended configuration or towards the extended configuration. FIG. 8a shows a set of (four) hinges 15 (i.e. positional control hinges) that use to provide positional control of the controllers. On each side, the hinges may allow the respective controller to rotate its axis into the users' desired position.

Figure 8B:
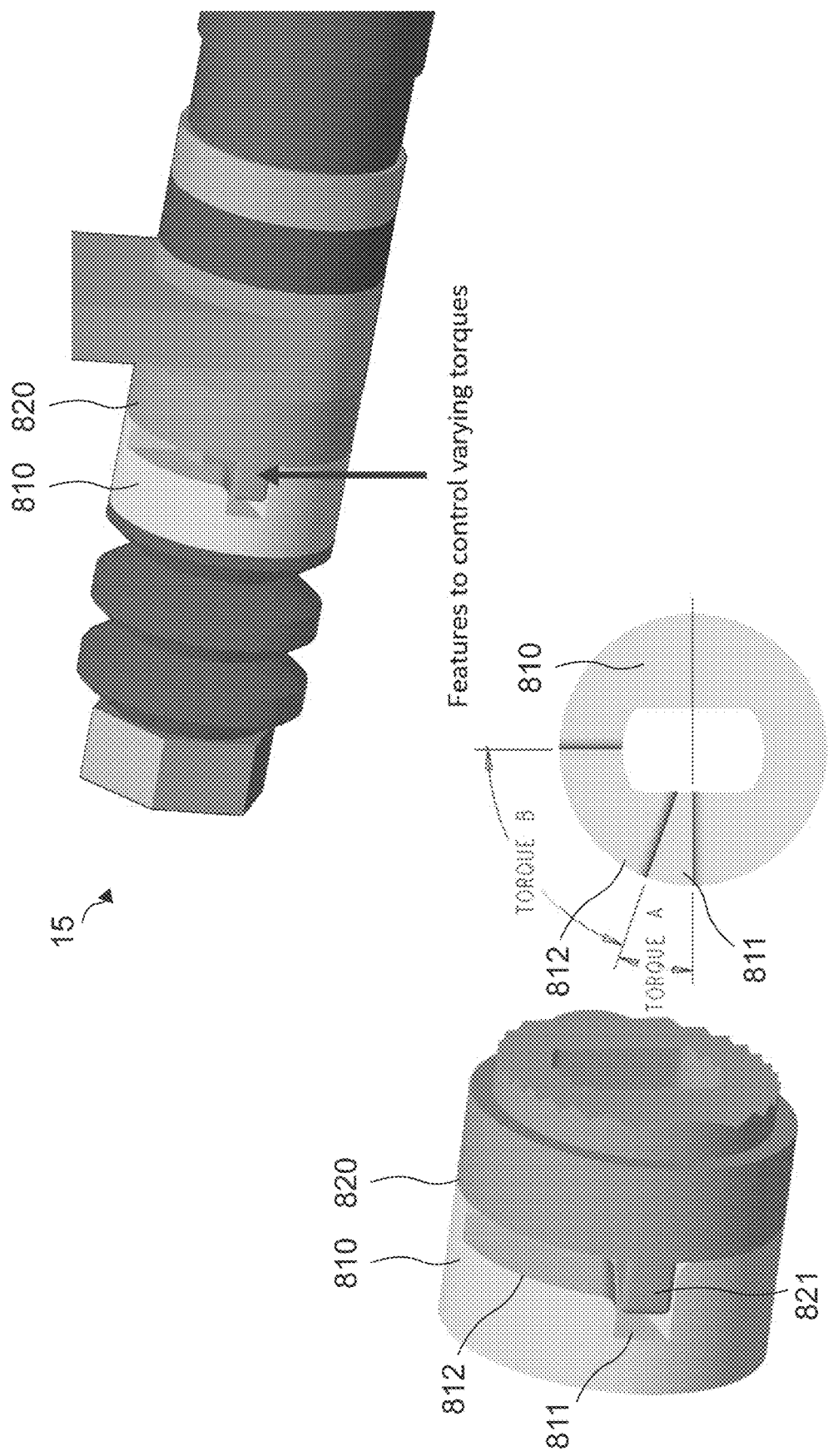
FIG. 8b shows a schematic illustration of a hinge with variable torque.

For example, a (set of) hinges 15 with variable torque may be used to force the input controllers towards the extended configuration or towards the extended configuration. FIG. 8b shows a schematic illustration of a hinge 15 with variable torque. Such a hinge is, e.g. known from US 2015/0169009 A1. FIG. 8b shows hinge design details that enable different torques. The hinge comprises two components 810; 820 that interact with each other. The interaction between these components generates two different torques. Torque A, which is generated between an elevated portion 821 of the second component 820 and a first notch 811 of the first component, is equivalent to a very low torque when controllers are in Fold-in mode (i.e. retracted configuration). Torque B, which is generated between the elevated portion 821 of the second component 820 and a second, shallower notch 812 of the first component, is a higher torque to lock the controllers in Fold-out mode (i.e. extended configuration at users' desired position.

More details and aspects of the handheld device or the folding mechanism/hinge are mentioned in connection with the proposed concept or one or more examples described above or below (e.g. FIG. 1a to 7c, 9a to 9c). The handheld device or the folding mechanism/hinge may comprise one or more additional optional features corresponding to one or more aspects of the proposed concept or one or more examples described above or below.

Examples of the present disclosure further provide a dock for a handheld device.

Figure 9A:
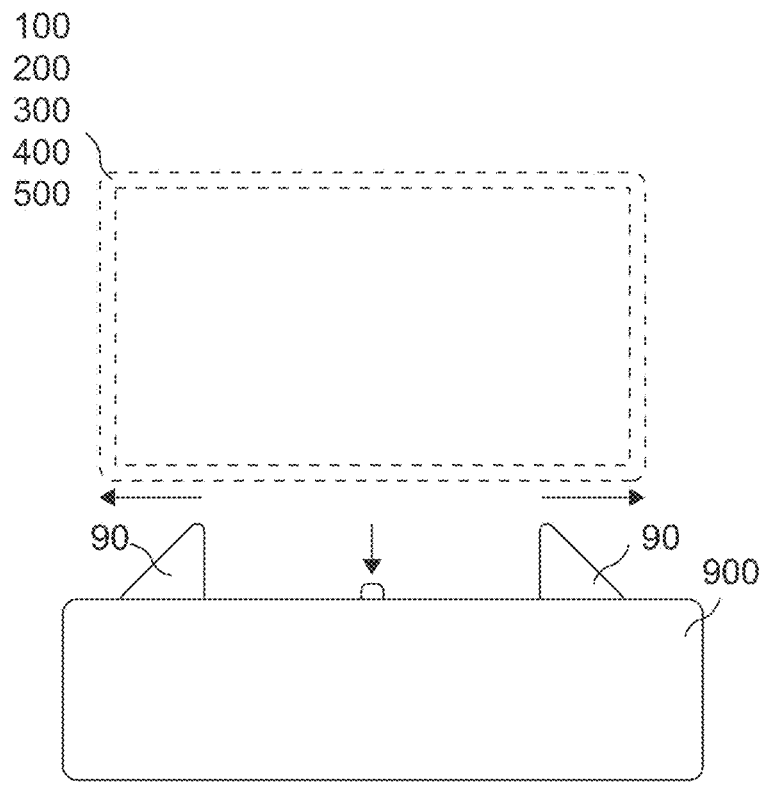
FIG. 9a shows an illustration of an example of a dock for a handheld device with a sliding mechanism.
Figure 9B:
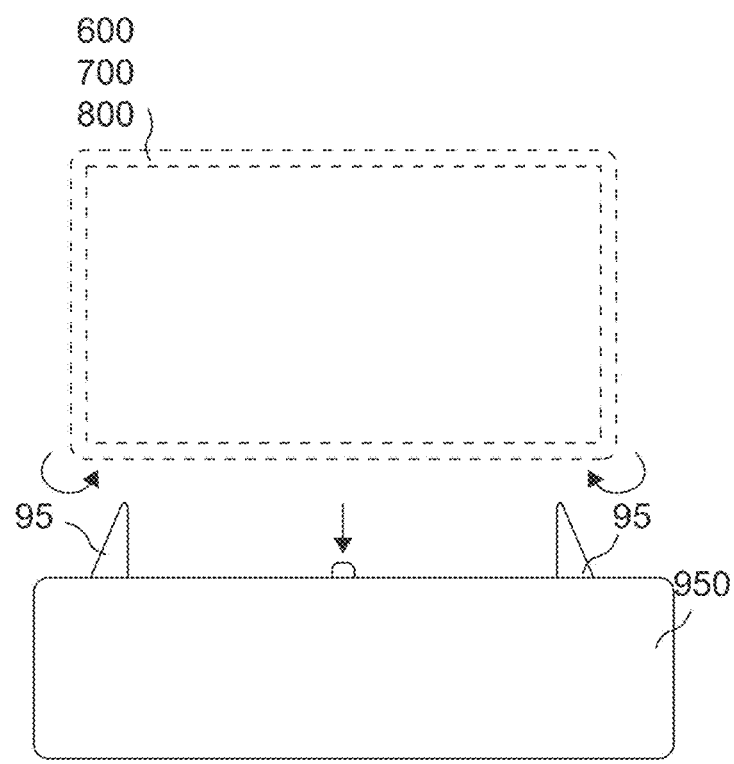
FIG. 9b shows an illustration of an example of a dock for a handheld device with a folding mechanism.

FIGS. 9a and 9b show illustrations of examples of a dock for a handheld device, e.g. for one of the handheld devices 100; 200; 300; 400; 500a-d; 600; 700; 800 shown in connection with FIGS. 1a to 8b. For example, FIG. 9a shows an illustration of an example of a dock for a handheld device with a sliding mechanism (as shown in connection with FIGS. 1a to 5d) and FIG. 9b shows an illustration of an example of a dock for a handheld device with a folding mechanism (as shown in connection with FIGS. 6a to 8b). To recapitulate, the handheld device comprises a main unit 10 with a display 11 (display means) of the handheld device and two input controllers 12; 13 (two input controlling means) being non-removably attached to the main unit via an extension mechanism (extension means), such as a sliding mechanism/sliding means 14 or a folding mechanism/folding means 15. The dock comprises at least one mechanical component 90; 95 (mechanical means) for forcing the two input controllers of the handheld device into an extended configuration via the extension mechanism when the handheld device is connected to the dock.

Figure 9C:
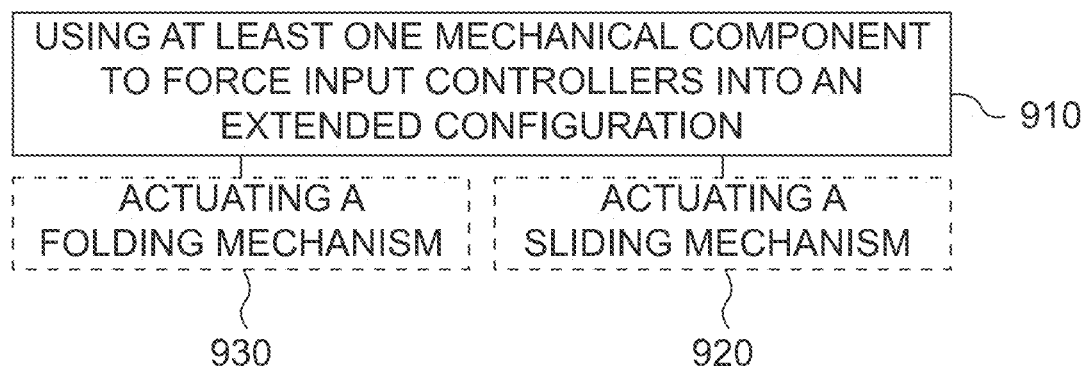
FIG. 9c shows a flow chart of an example of a method for a dock for a handheld device.

FIGS. 9*a* and 9*c* also show corresponding systems comprising the dock 900; 950 and one of the handheld devices 100; 200; 300; 400; 500*a-d* or one of the handheld devices 600; 700; 800, respectively.

FIG. 9*c* shows a flow chart of an example of a corresponding method for the dock for the handheld device. The method comprises using 910 at least one mechanical component of the dock to force the two input controllers of the handheld device into an extended configuration via the extension mechanism when the handheld device is connected to the dock.

The following description relates to the dock of FIGS. 9*a* and/or 9*b* and to the corresponding method of FIG. 9*c*. Features introduced in connection with the dock can likewise be introduced into the corresponding method (and vice versa).

As shown in FIGS. 9*a* and 9*b*, The dock comprises at least one mechanical component (mechanical means) 90; 95 for forcing the two input controllers of the handheld device into the extended configuration via the extension mechanism when the handheld device is connected to the dock. In other words, the at least one mechanical component may push the controllers into the extended configuration when the handheld device is inserted into, or placed upon, the dock. For example, the at least one mechanical component 90 may be configured to actuate a sliding mechanism 14 of the handheld device. Correspondingly, the method may comprise actuating 920 the sliding mechanism to force the two input controllers of the handheld device into the extended configuration via the sliding mechanism when the handheld device is connected to the dock. For example, as shown in FIG. 9*a*, the input controllers may be forced outwards by the mechanical component 90. Alternatively, the mechanical component 90 may actuate the locking mechanism shown in connection with FIGS. 5*c* and 5*d*.

Alternatively, as shown in FIG. 9*b*, the at least one mechanical component 95 may be configured to actuate a folding mechanism 15 (folding means) of the handheld device. Correspondingly, the method may comprise actuating 930 the folding mechanism to force the two input controllers of the handheld device into the extended configuration via the folding mechanism when the handheld device is connected to the dock. For example, as shown in FIG. 9*b*, using the mechanical component 95, the two input controllers may be forced outwards and forwards. For example, the dock may comprise two half-cone or quarter-cone shaped mechanical components for forcing the controllers outwards and forwards into the extended configuration when the handheld device is placed on the dock.

As shown in FIGS. 9*a* and 9*c*, the dock may further comprise an electrical or data connector (shown in the middle).

More details and aspects of the dock and corresponding method are mentioned in connection with the proposed concept or one or more examples described above or below (e.g. FIG. 1*a* to 8*b*). The dock may comprise one or more additional optional features corresponding to one or more aspects of the proposed concept or one or more examples described above or below.

The aspects and features mentioned and described together with one or more of the previously detailed examples and figures, may as well be combined with one or more of the other examples in order to replace a like feature of the other example or in order to additionally introduce the feature to the other example.

An example (e.g., example 1) relates to a handheld device (100; 200; 300; 400; 500; 600; 700; 800) comprising a main unit (10) comprising a display (11) of the handheld device. The handheld device comprises two input controllers (12; 13) being non-removably attached to the main unit via an extension mechanism (14; 15), the extension mechanism being configured such, that the two input controllers are movable from a retracted configuration to an extended configuration.

Another example (e.g., example 2) relates to a previously described example (e.g., example 1) or to any of the examples described herein, further comprising that the extension mechanism is a sliding mechanism (14).

Another example (e.g., example 3) relates to a previously described example (e.g., example 1) or to any of the examples described herein, further comprising that the extension mechanism is a folding mechanism (15).

Another example (e.g., example 4) relates to a previously described example (e.g., one of the examples 1 to 3) or to any of the examples described herein, further comprising that the two input controllers are arranged at two opposing sides of the main unit.

Another example (e.g., example 5) relates to a previously described example (e.g., one of the examples 1 to 4) or to any of the examples described herein, further comprising that the two input controllers each comprise one or more input devices (16) for controlling the handheld device.

Another example (e.g., example 6) relates to a previously described example (e.g., example 5) or to any of the examples described herein, further comprising that the one or more input devices comprise one or more of a button (16*a*), a control stick (16*b*) and a D-pad (16*c*).

Another example (e.g., example 7) relates to a previously described example (e.g., one of the examples 5 to 6) or to any of the examples described herein, further comprising that at least one input device of each input controller is uncovered in the extended configuration.

Another example (e.g., example 8) relates to a previously described example (e.g., one of the examples 5 to 7) or to any of the examples described herein, further comprising that the at least one input device is facing the same direction as the display in the extended configuration.

Another example (e.g., example 9) relates to a previously described example (e.g., one of the examples 1 to 8) or to any of the examples described herein, further comprising that one or more cooling vents (17) are uncovered in the extended configuration.

Another example (e.g., example 10) relates to a previously described example (e.g., one of the examples 1 to 9) or to any of the examples described herein, further comprising that the handheld device is suitable for use in a landscape configuration when the two input controllers are in the extended configuration.

Another example (e.g., example 11) relates to a previously described example (e.g., one of the examples 1 to 10) or to any of the examples described herein, further comprising that the handheld device is suitable for use in a portrait configuration when one of the two input controllers is in the extended configuration and the other input controller is in the retracted configuration.

Another example (e.g., example 12) relates to a previously described example (e.g., one of the examples 1 to 11) or to any of the examples described herein, further comprising that the two input controllers are shaped to form hand grips for holding the handheld device.

Another example (e.g., example 13) relates to a previously described example (e.g., one of the examples 1 to 12) or to any of the examples described herein, further comprising that a diagonal size of the display (11) of the main unit is at least 7 inches and/or at most 9 inches.

Another example (e.g., example 14) relates to a previously described example (e.g., one of the examples 1 to 13) or to any of the examples described herein, further comprising that the two input controllers each comprise at least one battery (18) of the handheld device, or wherein the two input controllers each comprise a battery compartment (18*a*) of the handheld device.

Another example (e.g., example 15) relates to a previously described example (e.g., one of the examples 1 to 14) or to any of the examples described herein, further comprising that the input controllers comprise a longitudinal form, with at least one terminal of the longitudinal form having an angle unequal 90° with respect to a surface along the longitudinal extent of the controller, so that, when the handheld device is deposited on a surface via the respective terminal, the display comprises an angle of unequal 90° to the surface.

Another example (e.g., example 16) relates to a previously described example (e.g., one of the examples 1 to 15) or to any of the examples described herein, further comprising that the extension mechanism comprises a mechanical (530; 531) or magnetic (541) component for retaining the input controllers in the retracted configuration.

Another example (e.g., example 17) relates to a previously described example (e.g., one of the examples 1 to 16) or to any of the examples described herein, further comprising that the extension mechanism is a folding mechanism comprising a hinge (15), wherein the hinge is configured such, that the input controllers are mechanically forced towards the extended configuration or towards the extended configuration.

Another example (e.g., example 18) relates to a previously described example (e.g., one of the examples 1 to 17) or to any of the examples described herein, further comprising that the handheld device comprises a world-facing camera (19).

Another example (e.g., example 19) relates to a previously described example (e.g., one of the examples 1 to 18) or to any of the examples described herein, further comprising that the handheld device is configured to provide a control of an operating system and/or of one or more applications being installed on the handheld device via the input controllers.

Another example (e.g., example 20) relates to a previously described example (e.g., one of the examples 1 to 19) or to any of the examples described herein, further comprising that the handheld device comprises a sensor to detect a change between the retracted configuration and the extended configuration, the handheld device being configured to launch an application launcher upon detection of the change to the extended configuration.

Another example (e.g., example 21) relates to a previously described example (e.g., one of the examples 1 to 20) or to any of the examples described herein, further comprising that the handheld device is a handheld gaming device.

Another example (e.g., example 22) relates to a previously described example (e.g., one of the examples 1 to 21) or to any of the examples described herein, further comprising that the handheld device is usable as a tablet computer or as a display when the two input controllers are in the retracted position.

An example (e.g., example 23) relates to a dock (900; 950) for a handheld device (100; 200; 300; 400; 500; 600; 700; 800), the handheld device comprising a main unit (10) comprising a display (11) of the handheld device and two input controllers (12;13) being non-removably attached to the main unit via an extension mechanism (14; 15), wherein the dock comprises at least one mechanical component (90;95) for forcing the two input controllers of the handheld device into an extended configuration via the extension mechanism when the handheld device is connected to the dock.

Another example (e.g., example 24) relates to a previously described example (e.g., example 23) or to any of the examples described herein, further comprising that the at least one mechanical component (90) is configured to actuate a sliding mechanism (14) of the handheld device.

Another example (e.g., example 25) relates to a previously described example (e.g., example 23) or to any of the examples described herein, further comprising that the at least one mechanical component (95) is configured to actuate a folding mechanism (15) of the handheld device.

An example (e.g., example 26) relates to a system comprising the handheld device (100; 200; 300; 400; 500; 600; 700; 800) according to one of the examples 1 to 22 and the dock (900; 950) according to one of the examples 23 to 25.

An example (e.g., example 27) relates to a handheld device (100; 200; 300; 400; 500; 600; 700; 800) comprising a main unit (10) comprising a display means (11) of the handheld device. The handheld device comprises two input controlling means (12; 13) being non-removably attached to the main unit via an extension means (14; 15), the extension means being configured such, that the two input controlling means are movable from a retracted configuration to an extended configuration.

Another example (e.g., example 28) relates to a previously described example (e.g., example 27) or to any of the examples described herein, further comprising that the extension means is a sliding means (14).

Another example (e.g., example 29) relates to a previously described example (e.g., example 27) or to any of the examples described herein, further comprising that the extension means is a folding means (15).

Another example (e.g., example 30) relates to a previously described example (e.g., one of the examples 27 to 29) or to any of the examples described herein, further comprising that the two input controlling means are arranged at two opposing sides of the main unit.

Another example (e.g., example 31) relates to a previously described example (e.g., one of the examples 27 to 30) or to any of the examples described herein, further comprising that the two input controlling means each comprise one or more input devices (16) for controlling the handheld device.

Another example (e.g., example 32) relates to a previously described example (e.g., example 31) or to any of the examples described herein, further comprising that the one or more input devices comprise one or more of a button (16*a*), a control stick (16*b*) and a D-pad (16*c*).

Another example (e.g., example 33) relates to a previously described example (e.g., one of the examples 31 to 32) or to any of the examples described herein, further comprising that at least one input device of each input controlling means is uncovered in the extended configuration.

Another example (e.g., example 34) relates to a previously described example (e.g., one of the examples 31 to 33) or to any of the examples described herein, further comprising that the at least one input device is facing the same direction as the display in the extended configuration.

Another example (e.g., example 35) relates to a previously described example (e.g., one of the examples 27 to 34) or to any of the examples described herein, further comprising that one or more cooling vents (17) are uncovered in the extended configuration.

Another example (e.g., example 36) relates to a previously described example (e.g., one of the examples 27 to 35) or to any of the examples described herein, further comprising that the handheld device is suitable for use in a landscape configuration when the two input controlling means are in the extended configuration.

Another example (e.g., example 37) relates to a previously described example (e.g., one of the examples 27 to 36) or to any of the examples described herein, further comprising that the handheld device is suitable for use in a portrait configuration when one of the two input controlling means is in the extended configuration and the other input controlling means is in the retracted configuration.

Another example (e.g., example 38) relates to a previously described example (e.g., one of the examples 27 to 37) or to any of the examples described herein, further comprising that the two input controlling means are shaped to form hand grips for holding the handheld device.

Another example (e.g., example 39) relates to a previously described example (e.g., one of the examples 27 to 38) or to any of the examples described herein, further comprising that a diagonal size of the display means (11) of the main unit is at least 7 inches and/or at most 9 inches.

Another example (e.g., example 40) relates to a previously described example (e.g., one of the examples 27 to 39) or to any of the examples described herein, further comprising that the two input controlling means each comprise at least one battery (18) of the handheld device, or wherein the two input controlling means each comprise a battery compartment (18*a*) of the handheld device.

Another example (e.g., example 41) relates to a previously described example (e.g., one of the examples 27 to 40) or to any of the examples described herein, further comprising that the input controlling means comprise a longitudinal form, with at least one terminal of the longitudinal form having an angle unequal 90° with respect to a surface along the longitudinal extent of the input controlling means, so that, when the handheld device is deposited on a surface via the respective terminal, the display means comprises an angle of unequal 90° to the surface.

Another example (e.g., example 42) relates to a previously described example (e.g., one of the examples 27 to 41) or to any of the examples described herein, further comprising that the extension means comprises a mechanical (530; 531) or magnetic (541) component for retaining the input controlling means in the retracted configuration.

Another example (e.g., example 43) relates to a previously described example (e.g., one of the examples 27 to 42) or to any of the examples described herein, further comprising that the extension mechanism is a folding means comprising a hinge (15), wherein the hinge is configured such, that the input controlling means are mechanically forced towards the extended configuration or towards the extended configuration.

Another example (e.g., example 44) relates to a previously described example (e.g., one of the examples 27 to 43) or to any of the examples described herein, further comprising that the handheld device comprises a world-facing imaging means, such as a camera (19) Another example (e.g., example 45) relates to a previously described example (e.g., one of the examples 27 to 44) or to any of the examples described herein, further comprising that the handheld device is configured to provide a control of an operating system and/or of one or more applications being installed on the handheld device via the input controlling means.

Another example (e.g., example 46) relates to a previously described example (e.g., one of the examples 27 to 45) or to any of the examples described herein, further comprising that the handheld device comprises a sensing means to detect a change between the retracted configuration and the extended configuration, the handheld device being configured to launch an application launcher upon detection of the change to the extended configuration.

Another example (e.g., example 47) relates to a previously described example (e.g., one of the examples 27 to 46) or to any of the examples described herein, further comprising that the handheld device is a handheld gaming device.

Another example (e.g., example 48) relates to a previously described example (e.g., one of the examples 27 to 47) or to any of the examples described herein, further comprising that the handheld device is usable as a tablet computer or as a display when the two input controlling means are in the retracted position.

An example (e.g., example 49) relates to a dock (900; 950) for a handheld device (100; 200; 300; 400; 500; 600; 700; 800), the handheld device comprising a main unit (10) comprising a display means (11) of the handheld device and two input controlling means (12 13) being non-removably attached to the main unit via an extension means (14; 15), wherein the dock comprises at least one mechanical means (90; 95) for forcing the two input controlling means of the handheld device into an extended configuration via the extension mechanism when the handheld device is connected to the dock.

Another example (e.g., example 50) relates to a previously described example (e.g., example 49) or to any of the examples described herein, further comprising that the at least one mechanical means (90) is configured to actuate a sliding means (14) of the handheld device.

Another example (e.g., example 51) relates to a previously described example (e.g., example 49) or to any of the examples described herein, further comprising that the at least one mechanical means (95) is configured to actuate a folding means (15) of the handheld device.

An example (e.g., example 52) relates to a system comprising the handheld device (100; 200; 300; 400; 500; 600; 700; 800) according to one of the examples 27 to 51 and the dock (900; 950) according to one of the examples 52 to 54.

An example (e.g., example 53) relates to a method for a handheld device, the handheld device comprising a main unit comprising a display of the handheld device and two input controllers being non-removably attached to the main unit via an extension mechanism, the method comprising moving (110; 610), using the extension mechanism, the two input controllers between a retracted configuration and an extended configuration.

Another example (e.g., example 54) relates to a previously described example (e.g., example 53) or to any of the examples described herein, further comprising that the extension mechanism is a sliding mechanism, the method comprising moving (110), using the sliding mechanism, the two input controllers between a retracted configuration and an extended configuration.

Another example (e.g., example 55) relates to a previously described example (e.g., example 53) or to any of the examples described herein, further comprising that the extension mechanism is a folding mechanism, the method comprising moving (610), using the folding mechanism, the two input controllers between a retracted configuration and an extended configuration.

Another example (e.g., example 56) relates to a previously described example (e.g., one of the examples 53 to 55) or to any of the examples described herein, further comprising that the method comprises uncovering (120; 620) at least one input device and/or one or more cooling vents in the extended configuration.

Another example (e.g., example 57) relates to a previously described example (e.g., one of the examples 53 to 56) or to any of the examples described herein, further comprising that the extension mechanism is a folding mechanism comprising a hinge, wherein the method comprises mechanically forcing (630), using the hinge, the input controllers towards the extended configuration or towards the extended configuration.

Another example (e.g., example 58) relates to a previously described example (e.g., one of the examples 53 to 57) or to any of the examples described herein, further comprising that the method comprises providing (130; 640) a control of an operating system and/or of one or more applications being installed on the handheld device via the input controllers.

Another example (e.g., example 59) relates to a previously described example (e.g., one of the examples 53 to 58) or to any of the examples described herein, further comprising that the handheld device comprises a sensor to detect a change between the retracted configuration and the extended configuration, wherein the method comprises launching (140; 650) an application launcher upon detection of the change to the extended configuration.

An example (e.g., example 60) relates to a method for a dock for a handheld device, the handheld device comprising a main unit comprising a display of the handheld device and two input controllers being non-removably attached to the main unit via an extension mechanism, the method comprising using (910) at least one mechanical component of the dock to force the two input controllers of the handheld device into an extended configuration via the extension mechanism when the handheld device is connected to the dock.

Another example (e.g., example 61) relates to a previously described example (e.g., example 60) or to any of the examples described herein, further comprising that the method comprises actuating (920) a sliding mechanism to force the two input controllers of the handheld device into the extended configuration via the sliding mechanism when the handheld device is connected to the dock.

Another example (e.g., example 62) relates to a previously described example (e.g., example 60) or to any of the examples described herein, further comprising that the method comprises actuating (930) a folding mechanism to force the two input controllers of the handheld device into the extended configuration via the folding mechanism when the handheld device is connected to the dock.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown.

Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. A handheld device comprising:
   a main unit comprising a display of the handheld device; and
   two input controllers being non-removably attached to the main unit via an extension mechanism, the extension mechanism being configured such, that the two input controllers are movable from a retracted configuration to an extended configuration,
   wherein one or more cooling vents are uncovered in the extended configuration.

2. The handheld device according to claim 1, wherein the extension mechanism is a sliding mechanism.

3. The handheld device according to claim 1, wherein the extension mechanism is a folding mechanism.

4. The handheld device according to claim 1, wherein the two input controllers are arranged at two opposing sides of the main unit.

5. The handheld device according to claim 1, wherein the two input controllers each comprise one or more input devices for controlling the handheld device.

6. The handheld device according to claim 5, wherein the one or more input devices comprise one or more of a button, a control stick and a D-pad.

7. The handheld device according to claim 5, wherein at least one input device of each input controller is uncovered in the extended configuration.

8. The handheld device according to claim 5, wherein the at least one input device is facing the same direction as the display in the extended configuration.

9. The handheld device according to claim 1, wherein the two input controllers are shaped to form hand grips for holding the handheld device.

10. The handheld device according to claim 1, wherein a diagonal size of the display of the main unit is at least 7 inches and/or at most 9 inches.

11. The handheld device according to claim 1, wherein the two input controllers each comprise at least one battery of the handheld device, or wherein the two input controllers each comprise a battery compartment of the handheld device.

12. The handheld device according to claim 1, wherein the input controllers comprise a longitudinal form, with at least one terminal of the longitudinal form having an angle unequal 90° with respect to a surface along the longitudinal extent of the controller, so that, when the handheld device is deposited on a surface via the respective terminal, the display comprises an angle of unequal 90° to the surface.

13. The handheld device according to claim 1, wherein the extension mechanism comprises a mechanical or magnetic component for retaining the input controllers in the retracted configuration.

14. The handheld device according to claim 1, wherein the extension mechanism is a folding mechanism comprising a hinge, wherein the hinge is configured such, that the input controllers are mechanically forced towards the extended configuration or towards the extended configuration.

15. The handheld device according to claim 1, comprising a world-facing camera.

16. The handheld device according to claim 1, wherein the handheld device is configured to provide a control of an operating system and/or of one or more applications being installed on the handheld device via the input controllers.

17. The handheld device according to claim 1, wherein the handheld device comprises a sensor to detect a change between the retracted configuration and the extended configuration, the handheld device being configured to launch an application launcher upon detection of the change to the extended configuration.

18. The handheld device according to claim 1, wherein the handheld device is a handheld gaming device.

19. A dock for a handheld device, the handheld device comprising a main unit comprising a display of the handheld device and two input controllers being non-removably attached to the main unit via an extension mechanism, wherein the dock comprises at least one mechanical component for forcing the two input controllers of the handheld device into an extended configuration via the extension mechanism when the handheld device is connected to the dock.

20. The dock according to claim 19, wherein the at least one mechanical component is configured to actuate a sliding mechanism of the handheld device.

21. The dock according to claim 19, wherein the at least one mechanical component is configured to actuate a folding mechanism of the handheld device.

22. A method for a handheld device, the handheld device comprising a main unit comprising a display of the handheld device and two input controllers being non-removably attached to the main unit via an extension mechanism, the method comprising:
   moving, using the extension mechanism, the two input controllers between a retracted configuration and an extended configuration, wherein one or more cooling vents of the handheld device are uncovered in the extended configuration.

23. The method for the handheld device according to claim 22, wherein the extension mechanism is a sliding mechanism, the method comprising moving, using the sliding mechanism, the two input controllers between a retracted configuration and an extended configuration.

24. The method for the handheld device according to claim 22, wherein the extension mechanism is a folding mechanism, the method comprising moving, using the folding mechanism, the two input controllers between a retracted configuration and an extended configuration.

* * * * *